(12) United States Patent
Yang

(10) Patent No.: US 12,309,502 B2
(45) Date of Patent: May 20, 2025

(54) IMAGE PROCESSING METHOD, CAMERA ASSEMBLY AND MOBILE TERMINAL

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 193 days.

(21) Appl. No.: 18/296,480

(22) Filed: Apr. 6, 2023

(65) Prior Publication Data
US 2023/0247308 A1    Aug. 3, 2023

Related U.S. Application Data

(63) Continuation of application No. PCT/CN2020/130137, filed on Nov. 19, 2020.

(30) Foreign Application Priority Data

Oct. 26, 2020    (CN) .......................... 202011154736.6

(51) Int. Cl.
*H04N 23/84* (2023.01)
*G06T 5/50* (2006.01)
(Continued)

(52) U.S. Cl.
CPC ............. *H04N 23/843* (2023.01); *G06T 5/50* (2013.01); *G06T 5/73* (2024.01); *H04N 25/10* (2023.01);
(Continued)

(58) Field of Classification Search
CPC .... H04N 23/843; H04N 25/10; H04N 23/667; H04N 23/12; H04N 23/125;
(Continued)

(56) References Cited

U.S. PATENT DOCUMENTS 5,172,220 A * 12/1992 Beis ................. G08B 13/19669
348/262
7,633,529 B2 * 12/2009 Park ..................... H04N 23/667
348/222.1
(Continued)

FOREIGN PATENT DOCUMENTS

| CN | 104170376 A | 11/2014 |
|---|---|---|
| CN | 104335571 A | 2/2015 |

(Continued)

OTHER PUBLICATIONS

European Search Report, European Patent Application No. 20959470.4, mailed Mar. 25, 2024 (36 pages).
(Continued)

*Primary Examiner* — Timothy J Henn
(74) *Attorney, Agent, or Firm* — Ladas & Parry LLP

(57) ABSTRACT

An image processing method, a camera assembly, and a mobile terminal. The image processing method includes: obtaining a full-size image in a first operation mode; obtaining a first YUV image by processing the full-size image with an image processing pipeline; obtaining a color image and a panchromatic image in a second operation mode; and obtaining a second YUV image by processing the color image and the panchromatic image with the image processing pipeline.

20 Claims, 16 Drawing Sheets

(51) Int. Cl.
 G06T 5/73 (2024.01)
 H04N 25/10 (2023.01)
(52) U.S. Cl.
 CPC .............. *G06T 2207/10024* (2013.01); *G06T 2207/20221* (2013.01)
(58) Field of Classification Search
 CPC .. H04N 23/951; H04N 25/133; H04N 25/135; H04N 9/646; H04N 23/80; H04N 23/81; H04N 23/54; H04N 23/88; G06T 5/50; G06T 5/73; G06T 2207/10024; G06T 2207/20221; G06T 3/4015
 See application file for complete search history.

(56) References Cited

U.S. PATENT DOCUMENTS

| | | |
|---|---|---|
| 2008/0068477 A1 | 3/2008 | Iida et al. |
| 2008/0218597 A1 | 9/2008 | Cho |
| 2008/0240601 A1* | 10/2008 | Adams, Jr. ........... H04N 25/133 382/266 |
| 2013/0329098 A1 | 12/2013 | Lim et al. |
| 2014/0320602 A1* | 10/2014 | Govindarao ......... G06T 3/4061 348/46 |
| 2015/0029358 A1 | 1/2015 | Kaizu et al. |

FOREIGN PATENT DOCUMENTS

| | | |
|---|---|---|
| CN | 105430358 A | 3/2016 |
| CN | 105430361 A | 3/2016 |
| CN | 107360342 A | 11/2017 |
| CN | 107924554 A | 4/2018 |
| CN | 109690628 A | 4/2019 |
| CN | 110493583 A | 11/2019 |
| CN | 111314592 A | 6/2020 |
| CN | 111586375 A | 8/2020 |
| CN | 111741221 A | 10/2020 |
| CN | 111741277 A | 10/2020 |
| CN | 111757006 A | 10/2020 |
| WO | 2018137267 A1 | 8/2018 |

OTHER PUBLICATIONS

Chinese First Office Action, Chinese Application No. 202011154736.6, mailed Jun. 17, 2021 (14 pages).
Notification to Grant Patent Right for Invention, Chinese Application No. 202011154736.6, mailed Aug. 27, 2021 (6 pages).
International Search Report, International Application No. PCT/CN2020/130137, mailed Jul. 26, 2021 (14 pages).

* cited by examiner

IMAGE PROCESSING METHOD, CAMERA ASSEMBLY AND MOBILE TERMINAL

CROSS REFERENCE

The present disclosure is a continuation-application of International (PCT) Patent Application No. PCT/CN2020/130137, filed on Nov. 19, 2020, which claims priority of Chinese Patent Application No. 202011154736.6, filed on Oct. 26, 2020, the entire contents of which are hereby incorporated by reference in their entirety.

TECHNICAL FIELD

The present disclosure relates to the field of imaging technologies, and in particular to an image processing method, a camera assembly, and a mobile terminal.

BACKGROUND

Mobile phones and other electronic devices are often equipped with a camera to take pictures. The camera is arranged with an image sensor. In order to capture color images, a filter array in the form of Bayer arrays is usually arranged in the image sensor, such that multiple pixels in the image sensor can receive light passing through corresponding filters to generate pixel signals with different color channels.

SUMMARY OF THE DISCLOSURE

The present disclosure provides an image processing method, a camera assembly, and a mobile terminal.

An image processing method applied to an image sensor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel; the method comprises: obtaining a full-size image in a first operation mode of the image sensor; wherein the full-size image comprises a plurality of image pixels, a pixel value of each image pixel being generated by one of the at least one panchromatic photoreceptor pixel or one of the at least one color photoreceptor pixel; obtaining a first YUV image by processing the full-size image with an image processing pipeline; obtaining a color image and a panchromatic image in a second operation mode of the image sensor; wherein the color image comprises a plurality of first image pixels, a pixel value of each first image pixel being generated by at least one color-sensitive pixel or at least one panchromatic-sensitive pixel in a corresponding subunit; the panchromatic image comprises a plurality of second image pixels, a pixel value of each second image pixel being generated by at least one panchromatic light-sensitive pixel in a corresponding subunit; and obtaining a second YUV image by processing the color image and the panchromatic image with the image processing pipeline.

A camera assembly, comprising an image sensor and a processor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel; wherein the processor is configured to perform an image processing method comprising: obtaining a full-size image in a first operation mode of the image sensor; wherein the full-size image comprises a plurality of image pixels, a pixel value of each image pixel being generated by one of the at least one panchromatic photoreceptor pixel or one of the at least one color photoreceptor pixel; obtaining a first YUV image by processing the full-size image with an image processing pipeline; obtaining a color image and a panchromatic image in a second operation mode of the image sensor; wherein the color image comprises a plurality of first image pixels, a pixel value of each first image pixel being generated by at least one color-sensitive pixel or at least one panchromatic-sensitive pixel in a corresponding subunit; the panchromatic image comprises a plurality of second image pixels, a pixel value of each second image pixel being generated by at least one panchromatic light-sensitive pixel in a corresponding subunit; and obtaining a second YUV image by processing the color image and the panchromatic image with the image processing pipeline.

A mobile terminal, comprising: a camera assembly; and a housing, wherein the camera assembly is arranged on the housing. The camera assembly comprises an image sensor and a processor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel; wherein the processor is configured to perform an image processing method comprising: obtaining a full-size image in a first operation mode of the image sensor; wherein the full-size image comprises a plurality of image pixels, a pixel value of each image pixel being generated by one of the at least one panchromatic photoreceptor pixel or one of the at least one color photoreceptor pixel; obtaining a first YUV image by processing the full-size image with an image processing pipeline; obtaining a color image and a panchromatic image in a second operation mode of the image sensor; wherein the color image comprises a plurality of first image pixels, a pixel value of each first image pixel being generated by at least one color-sensitive pixel or at least one panchromatic-sensitive pixel in a corresponding subunit; the panchromatic image comprises a plurality of second image pixels, a pixel value of each second image pixel being generated by at least one panchromatic light-sensitive pixel in a corresponding subunit; and obtaining a second YUV image by processing the color image and the panchromatic image with the image processing pipeline.

Additional aspects and advantages of the embodiments of the present disclosure will be given in part in the following description, and will become apparent in part from the following description, or by the practice of the present disclosure.

BRIEF DESCRIPTION OF THE DRAWINGS

The foregoing and/or additional aspects and advantages of the present disclosure will become apparent and easily understood from the description of the embodiments in conjunction with the accompanying drawings below.

DETAILED DESCRIPTION

Embodiments of the present disclosure are described in detail below, and examples of the embodiments are shown in the accompanying drawings, where same or similar designation indicates same or similar element or an element having same or similar function. The embodiments described below by reference to the accompanying drawings are exemplary and are intended only to explain the embodiments of the present disclosure and are not to be construed as limiting the embodiments of the present disclosure.

In the related art, mobile phones and other electronic devices are often equipped with a camera to take pictures. The camera is arranged with an image sensor. In order to capture color images, a filter array in the form of Bayer arrays is usually arranged in the image sensor, such that multiple pixels in the image sensor can receive light passing through corresponding filters to generate pixel signals with different color channels. The image from Bayer array will have the problem of loss of sharpness after demosaicing.

Figure 1:
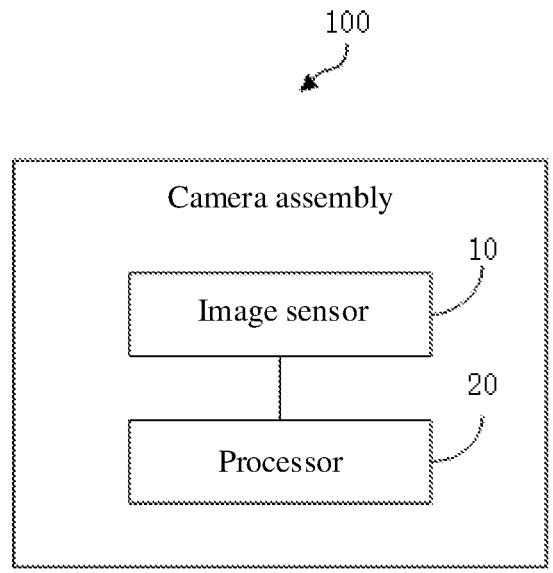
FIG. 1 is a schematic view of a camera assembly according to an embodiment of the present disclosure.
Figure 2:
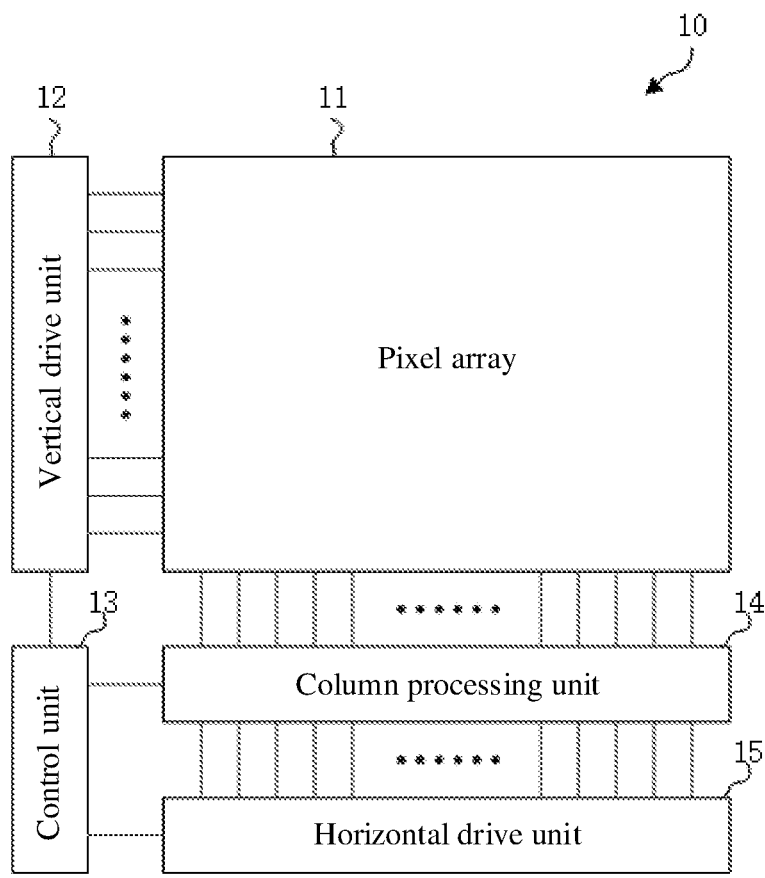
FIG. 2 is a schematic view of a pixel array according to an embodiment of the present disclosure.
Figure 5:
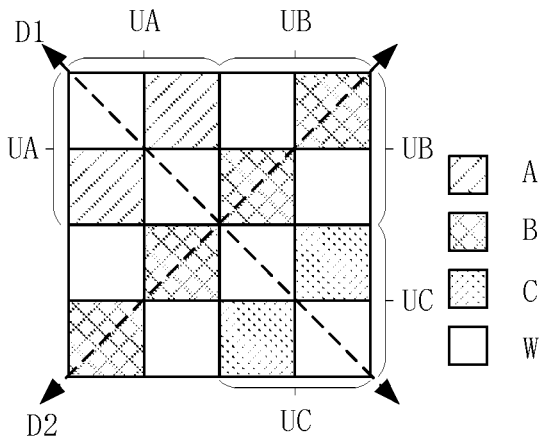
FIG. 5 is a schematic view of an arrangement of a smallest repeating unit in a pixel array according to an embodiment of the present disclosure.

For the foregoing reasons, referring to FIGS. 1, 2 and 5, the present disclosure provides a camera assembly 100. The camera assembly 100 includes an image sensor 10 and a processor 20. The image sensor 10 includes a pixel array 11, and the pixel array 11 includes multiple subunits, each subunit including at least one panchromatic light-sensitive pixel W and at least one color light-sensitive pixel; each color light-sensitive pixel has a narrower spectral response than each panchromatic light-sensitive pixel W. In a first operation mode of the image sensor 10, the pixel array 11 is exposed to obtain a full-size image, the full-size image including multiple image pixels, a pixel value of each image pixel being generated by one of the at least one panchromatic photoreceptor pixel or one of the at least one color photoreceptor pixel. In a second operation mode of the image sensor 10, the pixel array 11 is exposed to obtain a color image and a panchromatic image, the color image including multiple first image pixels, a pixel value of each first image pixel being generated by at least one color-sensitive pixel or at least one panchromatic-sensitive pixel in a corresponding subunit; the panchromatic image including multiple second image pixels, a pixel value of each second image pixel being generated by at least one panchromatic light-sensitive pixel in a corresponding subunit. The processor 20 is electrically connected to the image sensor 10. The processor 20 is configured to obtain a first YUV image by processing the full-size image with an image processing pipeline; and to obtain a second YUV image by processing the color image and the panchromatic image with the image processing pipeline. The processor 20 may refer to an image signal processor (ISP).

The camera assembly 100 of the present embodiments obtains a full-size image, a color image, and a panchromatic image by exposing the pixel array 11. The full-size image, the color image, and the panchromatic image are processed through the image processing pipeline to obtain the first YUV image and the second YUV image, respectively. Since the pixel values corresponding to the panchromatic light-sensitive pixels are processed during the image processing, the pixel values corresponding to the panchromatic light-sensitive pixels can be utilized to improve the signal-to-noise ratio and sharpness of the YUV image.

The camera assembly 100 of the present embodiments is described in detail below in conjunction with the accompanying drawings.

Referring to FIG. 2, the image sensor 10 includes a pixel array 11, a vertical drive unit 12, a control unit 13, a column processing unit 14, and a horizontal drive unit 15.

For example, the image sensor 10 may be adopted with a complementary metal oxide semiconductor (CMOS) sensor or a charge-coupled device (CCD) sensor.

Figure 3:
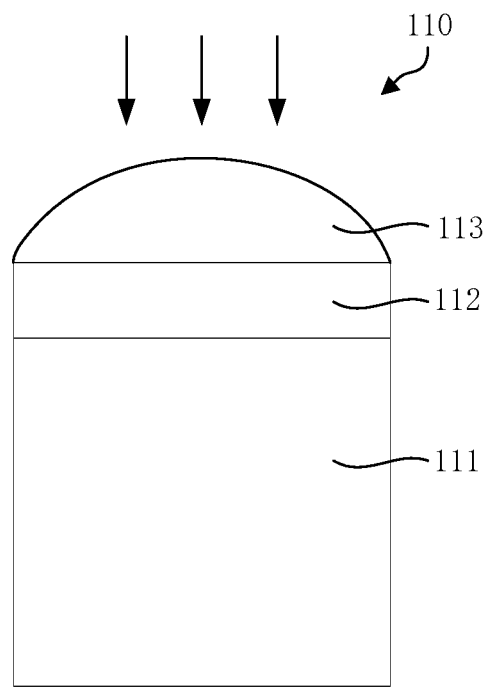
FIG. 3 is a cross-sectional schematic view of a light-sensitive pixel according to an embodiment of the present disclosure.
Figure 4:
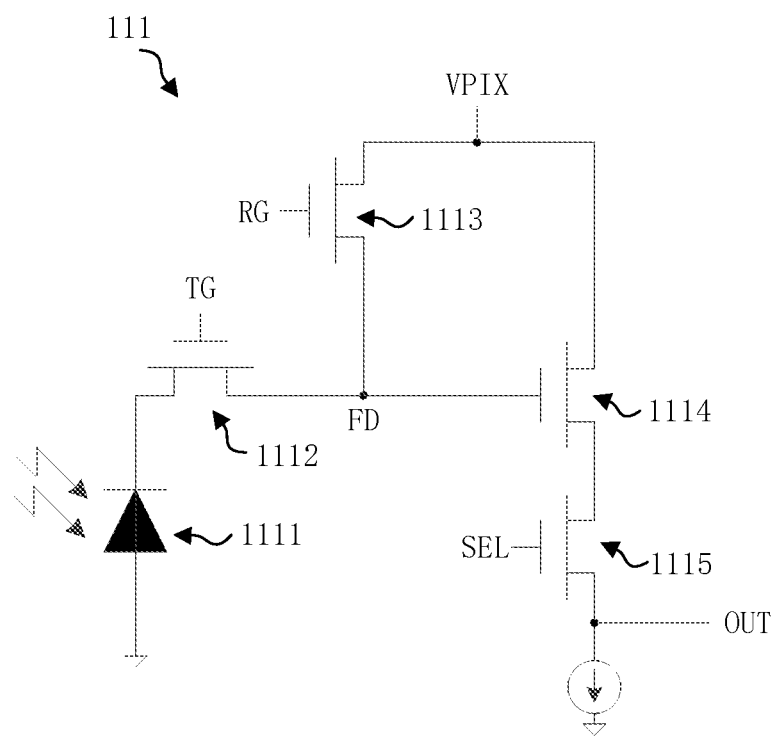
FIG. 4 is a pixel circuit diagram of a light-sensitive pixel according to an embodiment of the present disclosure.

For example, the pixel array 11 includes multiple light-sensitive pixels 110 (shown in FIG. 3) arranged in two dimensions in an array (i.e., arranged in a two-dimensional matrix), and each light-sensitive pixel 110 includes a photoelectric conversion element 1111 (shown in FIG. 4). Each light-sensitive pixel 110 converts light to electrical charge based on the intensity of the light incident on it.

For example, the vertical drive unit 12 includes a shift register and an address decoder. The vertical drive unit 12 includes a read-out scan and a reset scan function. The read-out scan is a sequential line-by-line scan of the unit light-sensitive pixels 110 from which signals are read line-by-line. For example, the signal output from each light-sensitive pixel 110 in a selected and scanned light-sensitive pixel row is transmitted to the column processing unit 14. The reset scan is to reset the electrical charge, and the photoelectric charge of the photoelectric conversion element 1111 is discarded such that the accumulation of a new photoelectric charge can be started.

For example, the signal processing performed by the column processing unit 14 is a correlated double sampling (CDS) processing. In the CDS processing, a reset level and a signal level output from each light-sensitive pixel 110 in the selected light-sensitive pixel row are taken, and a level difference is calculated and obtained. In this way, the signals of the light-sensitive pixels 110 in a row are obtained. The column processing unit 14 may have an analog-to-digital (A/D) conversion function for converting analog pixel signals to digital format.

For example, the horizontal drive unit 15 includes a shift register and an address decoder. The horizontal drive unit 15 sequentially scans the pixel array 11 column-by-column, and each light-sensitive pixel column is sequentially processed by the column processing unit 14 and sequentially output by the selective scanning operation performed by the horizontal drive unit 15.

For example, the control unit 13 configures timing signals according to an operation mode and controls the vertical drive unit 12, the column processing unit 14, and the horizontal drive unit 15 with the multiple timing signals to work together.

Referring to FIG. 3, the light-sensitive pixel 110 includes a pixel circuit 111, a filter 112, and a microlens 113. The microlens 113, the filter 112, and the pixel circuit 111 are disposed sequentially along a light-receiving direction of the light-sensitive pixel 110. The microlens 113 is configured to converge light, and the filter 112 is configured to pass light in a certain band and filter out light in the rest of the band. The pixel circuit 111 is configured to convert the received light into an electrical signal and provide a generated electrical signal to the column processing unit 14 shown in FIG. 2.

Referring to FIG. 4, the pixel circuit 111 may be applied to each light-sensitive pixel 110 (shown in FIG. 3) within the pixel array 11 shown in FIG. 2. The operation of the pixel circuit 111 is described below in connection with FIGS. 2-4.

Referring to FIG. 4, the pixel circuit 111 includes a photoelectric conversion element 1111 (e.g., a photodiode), an exposure control circuit (e.g., a transfer transistor 1112), a reset circuit (e.g., a reset transistor 1113), an amplification circuit (e.g., an amplification transistor 1114), and a selection circuit (e.g., a selection transistor 1115). In the embodiments of the present disclosure, the transfer transistor 1112, the reset transistor 1113, the amplification transistor 1114, and the selection transistor 1115 are, for example, MOS tubes, without limitation herein.

For example, the photoelectric conversion element 1111 includes a photodiode, with an anode of the photodiode connected to ground, for example. The photodiode converts the received light into an electrical charge. A cathode of the photodiode is connected to a floating diffusion (FD) unit through the exposure control circuit (e.g., transfer transistor 1112). The FD unit is connected to a gate of the amplification transistor 1114, and a source of the reset transistor 1113.

For example, the exposure control circuit is the transfer transistor 1112, and a control terminal (TG) of the exposure control circuit is a gate of the transfer transistor 1112. The transfer transistor 1112 is on when a pulse of an effective level (e.g., VPIX level) is transmitted to the gate of the transfer transistor 1112 through an exposure control line. The transfer transistor 1112 transfers the charge photoelectric-converted by the photodiode to the FD unit.

For example, a drain of the reset transistor 1113 is connected to a pixel power supply VPIX. The source of the reset transistor 113 is connected to the FD unit. Before the charge is transferred from the photodiode to the FD unit, the pulse of the effective reset level is transmitted to the gate of the reset transistor 113 through the reset line and the reset transistor 113 is on. The reset transistor 113 resets the FD unit to the pixel power supply VPIX.

For example, a gate of the amplification transistor 1114 is connected to the FD unit, and a drain of the amplification transistor 1114 is connected to the pixel power supply VPIX. After the FD unit is reset by the reset transistor 1113, the amplification transistor 1114 outputs a reset level through an output OUT via the selection transistor 1115. After the charge of the photodiode is transferred by the transfer transistor 1112, the amplification transistor 1114 outputs a signal level via the selection transistor 1115 through the output OUT.

For example, a drain of the selection transistor 1115 is connected to a source of the amplification transistor 1114. A source of the selection transistor 1115 is connected to the column processing unit 14 in FIG. 2 through the output OUT. The selection transistor 1115 is on when an effective level pulse is transmitted to a gate of the selection transistor 1115 through a selection line. The signal output from the amplification transistor 1114 is transmitted to column processing unit 14 through selection transistor 1115.

It is noted that the pixel structure of the pixel circuit 111 in the present disclosure is not limited to the structure shown in FIG. 4. For example, the pixel circuit 111 may have a three-transistor pixel structure in which the functions of the amplification transistor 1114 and the selection transistor 1115 are performed by a single transistor. For example, the exposure control circuit is not limited to the way of a single transfer transistor 1112, other electronic devices or structures having the function of controlling conduction at the control terminal can be used as the exposure control circuit in the present disclosure t, and the implementation of the single transfer transistor 1112 in in the present disclosure is simple, low cost, and easy to control.

Referring to FIGS. 5-15, FIGS. 5-15 are schematic views of arrangement of the light-sensitive pixels 110 (as shown in FIG. 3) in the pixel array 110 (as shown in FIG. 2) according to embodiments of the present disclosure. The light-sensitive pixels 110 include two types, panchromatic light-sensitive pixel W and color light-sensitive pixel. The pixel array 11 includes multiple smallest repeating units, each smallest repeating unit including multiple subunits. FIGS. 5-15 show only the arrangement of multiple light-sensitive pixels 110 in a smallest repeating unit consisting of four subunits, and in other examples, the number of subunits in each smallest repeating unit may also be two, three, five, ten, etc., without limitation herein. The smallest repeating unit consisting of four subunits shown in FIGS. 5-17 is replicated multiple times in rows and columns to form the pixel array 11. Each subunit includes at least one panchromatic light-sensitive pixel W and at least one color light-sensitive pixel. In each subunit, the panchromatic light-sensitive pixel W and the color light-sensitive pixel may be alternately arranged; or, in each subunit, multiple light-sensitive pixels 110 in the same row may have the same color channel; or, in each subunit, multiple light-sensitive pixels 110 in the same column may have the same color channel; or, in each smallest repeating unit, multiple light-sensitive pixels 110 in the same row and having the same color channel and multiple light-sensitive pixels 110 in the same column and having the same color channel may be alternately arranged; or, in each subunit, when the number of panchromatic light-sensitive pixel W is one and the number of the color light-sensitive pixels is multiple, the panchromatic light-sensitive pixels W may be disposed at any position in the subunit; or, in each subunit, when the number of the panchromatic light-sensitive pixels W is multiple and the number of color-sensitive pixel is one, the color-sensitive pixel may be disposed at any position in the subunit.

Specifically, for example, FIG. 5 is a schematic view of an arrangement of the light-sensitive pixels 110 (shown in FIG. 3) in a smallest repeating unit according to an embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| W | A | W | B |
|---|---|---|---|
| A | W | B | W |
| W | B | W | C |
| B | W | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 5, for each subunit, the panchromatic light-sensitive pixels W and light-sensitive pixels are arranged alternately.

As shown in FIG. 5, the subunits include three categories. A first category subunit UA includes multiple panchromatic light-sensitive pixels W and multiple first color light-sensitive pixels A; a second category subunit UB includes multiple panchromatic light-sensitive pixels W and multiple second color light-sensitive pixels B; and a third category subunit UC includes multiple panchromatic light-sensitive pixels W and multiple third color light-sensitive pixels C. Each smallest repeating unit includes four subunits, one first category subunit UA, two second category subunits UB, and one third category subunit UC, respectively; where the first category subunit UA and the third category subunit UC are arranged in a first diagonal direction D1 (e.g., a direction connecting the upper left and lower right corners in FIG. 5), and the two second category subunits UB are arranged in a second diagonal direction D2 (e.g., a direction connecting the upper right and lower left corners in FIG. 5). The first diagonal direction D1 is different from the second diagonal direction D2. For example, the first diagonal direction D1 and the second diagonal direction D2 are perpendicular to each other.

It should be noted that in other embodiments, the first diagonal direction D1 may be a direction connecting the upper right and lower left corners, and the second diagonal direction D2 may be a direction connecting the upper left and lower right corners. In addition, the "direction" here is not unidirectional, but may be understood as the concept of a "straight line" indicating the arrangement, which can have both ends of the line pointing in both directions. The explanation of the first diagonal direction D1 and the second diagonal direction D2 in FIGS. 6-10 below is the same as here.

Figure 6:
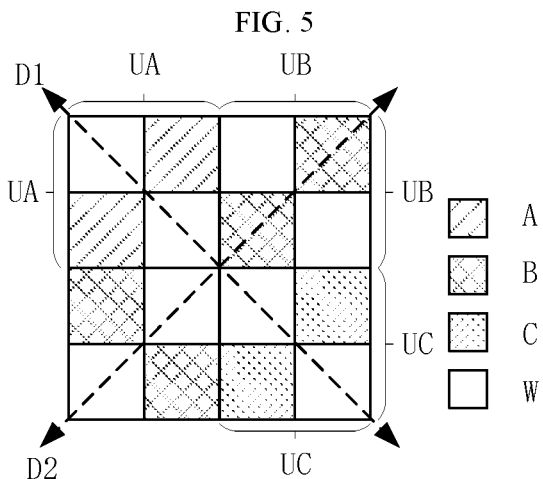
FIG. 6 is a schematic view of an arrangement of a smallest repeating unit in a pixel array according to another embodiment of the present disclosure.

For example, FIG. 6 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| W | A | W | B |
|---|---|---|---|
| A | W | B | W |
| B | W | W | C |
| W | B | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

The arrangement of the light-sensitive pixels 110 in the smallest repeating unit shown in FIG. 6 is approximately the same as that of the light-sensitive pixels 110 in the smallest repeating unit shown in FIG. 5, except that the alternating order of the panchromatic light-sensitive pixels W and the single-color light-sensitive pixels in the second category subunit UB disposed in the lower left corner of FIG. 6 is different from the alternating order of the panchromatic light-sensitive pixels W and the single-color light-sensitive pixels in the second category subunit UB disposed in the lower left corner of FIG. 5. Specifically, in the second category subunit UB disposed in the lower left corner of FIG. 5, the alternating order of the light-sensitive pixels 110 in the first row is panchromatic light-sensitive pixel W, color light-sensitive pixel (i.e., second color light-sensitive pixel B), and the alternating order of the light-sensitive pixels 110 in the second row is color light-sensitive pixel (i.e., second color light-sensitive pixel B), panchromatic light-sensitive pixel W. In the second category subunit UB disposed in the lower left corner of FIG. 6, the alternating order of the light-sensitive pixels 110 in the first row is color light-sensitive pixel (i.e., second color light-sensitive pixel B), panchromatic light-sensitive pixel W, and the alternating order of the light-sensitive pixels 110 in the second row is panchromatic light-sensitive pixel W, color light-sensitive pixel (i.e., second color-sensitive pixel B).

As shown in FIG. 6, the alternating order of the panchromatic light-sensitive pixels W and the single-color light-sensitive pixels in the first category subunit UA and the third category subunit UC in FIG. 6 is not the same as the alternating order of the panchromatic light-sensitive pixels W and the color light-sensitive pixels in the second category subunit UB disposed in the lower left corner. Specifically, in the first category subunit UA and the third category subunit UC shown in FIG. 6, the alternating order of the light-sensitive pixels 110 in the first row is panchromatic light-sensitive pixel W, color light-sensitive pixel, and the alternating order of the light-sensitive pixels 110 in the second row is color light-sensitive pixel, panchromatic light-sensitive pixel W; while in the second category subunit UB shown in FIG. 6, disposed in the lower left corner, the alternating order of the light-sensitive pixels 110 in the first row is color light-sensitive pixel (i.e., third color light-sensitive pixel B), panchromatic light-sensitive pixel W, and the alternating order of photosensitive pixels 110 in the second row is panchromatic light-sensitive pixel W, color light-sensitive pixel (i.e., third color light-sensitive pixel B).

Therefore, according to FIG. 5 and FIG. 6, the alternating order of the panchromatic light-sensitive pixels W and color light-sensitive pixels within different subunits in the same smallest repeating unit may be consistent (as shown in FIG. 5) or inconsistent (as shown in FIG. 6).

Figure 7:
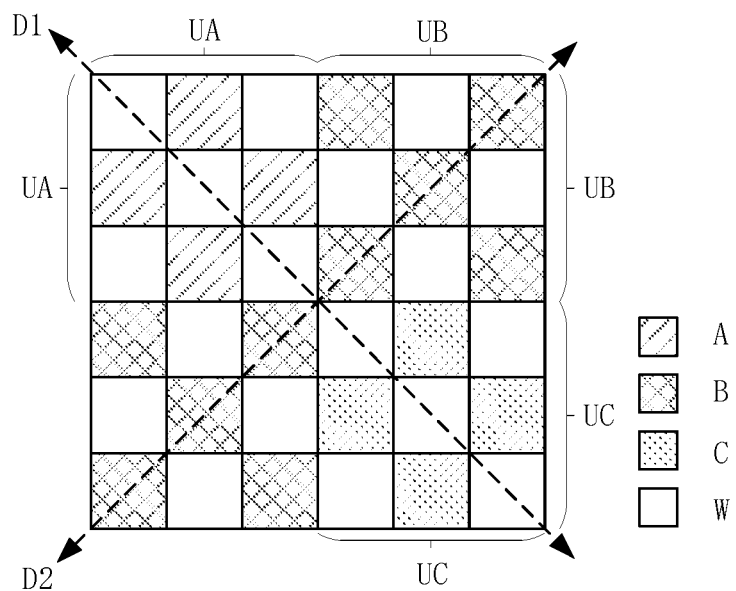
FIG. 7 is a schematic view of an arrangement of a smallest repeating unit in a pixel array according to further another embodiment of the present disclosure.

For example, FIG. 7 is a schematic view of an arrangement of the light-sensitive pixels 110 (shown in FIG. 3) in a smallest repeating unit according to another embodiment of the present disclosure. The smallest repeating unit includes 36 light-sensitive pixels 110 in 6 rows and 6 columns, and each subunit includes 9 light-sensitive pixels 110 in 3 rows and 3 columns. The arrangement is as follows.

| W | A | W | B | W | B |
|---|---|---|---|---|---|
| A | W | A | W | B | W |
| W | A | W | B | W | B |
| B | W | B | W | C | W |
| W | B | W | C | W | C |
| B | W | B | W | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 7, for each subunit, the panchromatic light-sensitive pixels W and light-sensitive pixels are arranged alternately.

As shown in FIG. 7, the subunits include three categories. A first category subunit UA includes multiple panchromatic light-sensitive pixels W and multiple first color light-sensitive pixels A; a second category subunit UB includes multiple panchromatic light-sensitive pixels W and multiple second color light-sensitive pixels B; and a third category subunit UC includes multiple panchromatic light-sensitive pixels W and multiple third color light-sensitive pixels C. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 8:
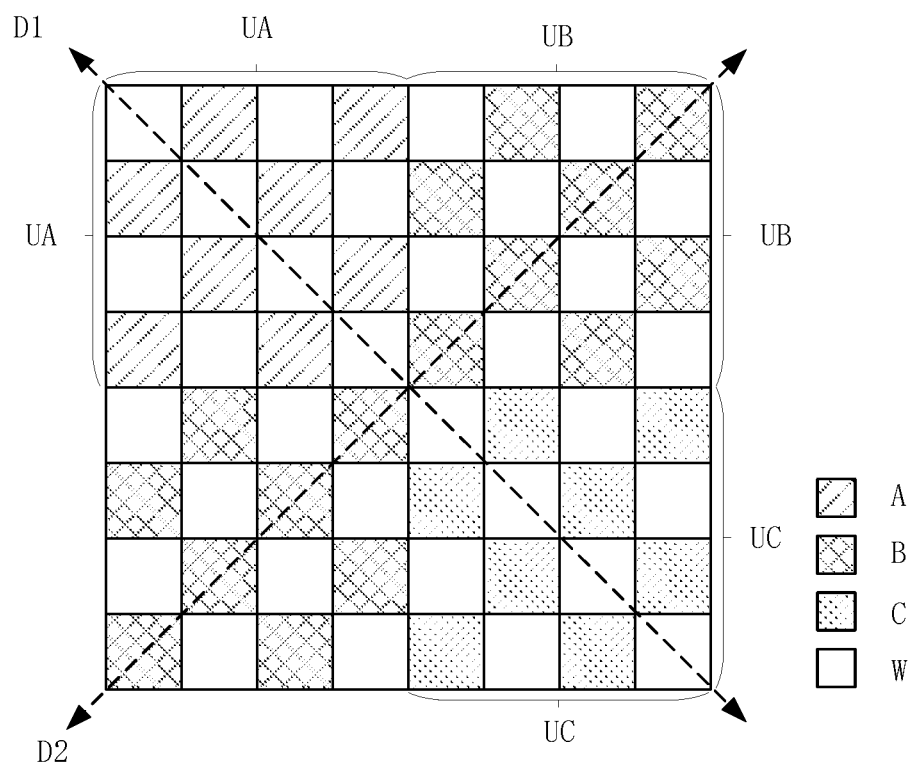
FIG. 8 is a schematic view of an arrangement of a smallest repeating unit in a pixel array according to still another embodiment of the present disclosure.

For example, FIG. 8 is a schematic view of an arrangement of the light-sensitive pixels 110 (shown in FIG. 3) in a smallest repeating unit according to another embodiment of the present disclosure. The smallest repeating unit includes 64 light-sensitive pixels 110 in 8 rows and 8 columns, and each subunit includes 16 light-sensitive pixels 110 in 4 rows and 4 columns. The arrangement is as follows.

| W | A | W | A | W | B | W | B |
|---|---|---|---|---|---|---|---|
| A | W | A | W | B | W | B | W |
| W | A | W | A | W | B | W | B |
| A | W | A | W | B | W | B | W |
| W | B | W | B | W | C | W | C |
| B | W | B | W | C | W | C | W |
| W | B | W | B | W | C | W | C |
| B | W | B | W | C | W | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 8, for each subunit, the panchromatic light-sensitive pixels W and single-color light-sensitive pixels are arranged alternately.

As shown in FIG. 8, the subunits include three categories. A first category subunit UA includes multiple panchromatic light-sensitive pixels W and multiple first color light-sensitive pixels A; a second category subunit UB includes multiple panchromatic light-sensitive pixels W and multiple second color light-sensitive pixels B; and a third category subunit UC includes multiple panchromatic light-sensitive pixels W and multiple third color light-sensitive pixels C. Each smallest repeating unit includes four subunits, one first category subunit UA, two second category subunit UB, and one third category subunit UC, respectively. The first diagonal direction D1 is different from the second diagonal direction D2. For example, the first diagonal direction D1 and the second diagonal direction D2 are perpendicular to each other.

Figure 9:
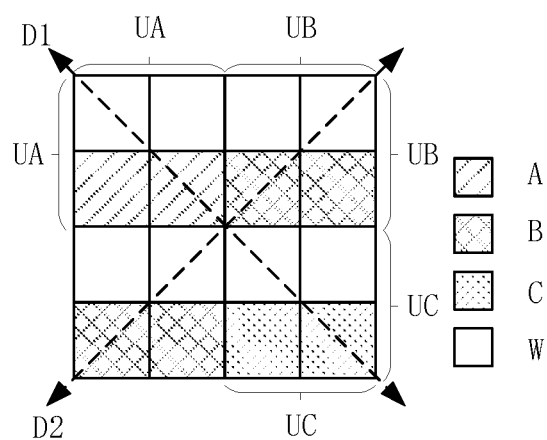
FIG. 9 is a schematic view of an arrangement of a smallest repeating unit in a pixel array according to still another embodiment of the present disclosure.

For example, FIG. 9 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| W | W | W | W |
|---|---|---|---|
| A | A | B | B |
| W | W | W | W |
| B | B | C | C |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 9, in each subunit, the multiple light-sensitive pixels 110 in the same row have the same color channel (i.e., multiple light-sensitive pixels 110 in the same row are light-sensitive pixels 110 of the same category). The same category of light-sensitive pixels 110 include (1) all panchromatic light-sensitive pixels W, (2) all first color light-sensitive pixels A, (3) all second color light-sensitive pixels B, and (4) all third color light-sensitive pixels C.

As shown in FIG. 9, the subunits include three categories. A first category subunit UA includes multiple panchromatic light-sensitive pixels W and multiple first color light-sensitive pixels A; a second category subunit UB includes multiple panchromatic light-sensitive pixels W and multiple second color light-sensitive pixels B; and a third category subunit UC includes multiple panchromatic light-sensitive pixels W and multiple third color light-sensitive pixels C. The light-sensitive pixels 110 having the same color channel may be disposed either in the first row of the subunit or in the second row of the subunit, without limitation herein. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 10:
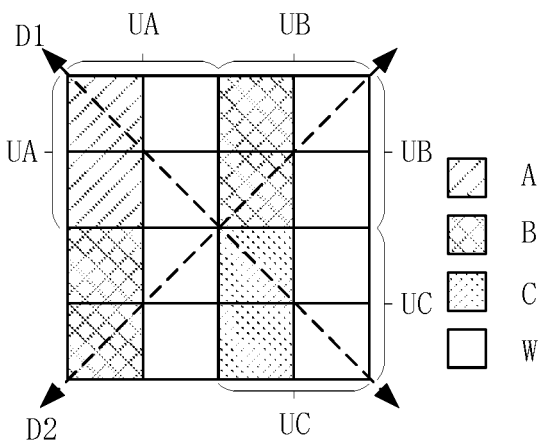
FIG. 10 is a schematic view of an arrangement of a smallest repeating unit in a pixel array according to still another embodiment of the present disclosure.

For example, FIG. 10 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| A | W | B | W |
|---|---|---|---|
| A | W | B | W |
| B | W | C | W |
| B | W | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 10, in each subunit, the multiple light-sensitive pixels 110 in the same column have the same color channel (i.e., multiple light-sensitive pixels 110 in the same column are light-sensitive pixels 110 of the same category). The same category of light-sensitive pixels 110 include (1) all panchromatic light-sensitive pixels W, (2) all first color light-sensitive pixels A, (3) all second color light-sensitive pixels B, and (4) all third color light-sensitive pixels C.

As shown in FIG. 10, the subunits include three categories. A first category subunit UA includes multiple panchromatic light-sensitive pixels W and multiple first color light-sensitive pixels A; a second category subunit UB includes multiple panchromatic light-sensitive pixels W and multiple second color light-sensitive pixels B; and a third category subunit UC includes multiple panchromatic light-sensitive pixels W and multiple third color light-sensitive pixels C. The light-sensitive pixels 110 having the same color channel may be disposed either in the first column of the subunit or in the second column of the subunit, without limitation herein. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 11:
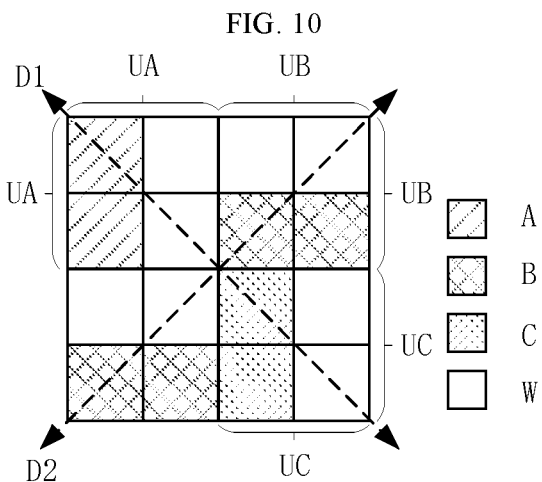
FIG. 11 is a schematic view of an arrangement of a smallest repeating unit in a pixel array according to still another embodiment of the present disclosure.

For example, FIG. 11 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| A | W | W | W |
|---|---|---|---|
| A | W | B | B |
| W | W | C | W |
| B | B | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 11, in each subunit, the multiple light-sensitive pixels 110 in the same column or row have the same color channel (i.e., multiple light-sensitive pixels 110 in the same column or row are light-sensitive pixels 110 of the same category). The same category of light-sensitive pixels 110 include (1) all panchromatic light-sensitive pixels W; (2) all first color light-sensitive pixels A; (3) all second color light-sensitive pixels B; and (4) all third color light-sensitive pixels C.

As shown in FIG. 11, the subunits include three categories. A first category subunit UA includes multiple panchromatic light-sensitive pixels W and multiple first color light-sensitive pixels A, with the multiple panchromatic light-sensitive pixels W in the same column and the multiple first color light-sensitive pixels A in the same column; a second category subunit UB includes multiple panchromatic light-sensitive pixels W and multiple second color light-sensitive pixels B, with the multiple panchromatic light-sensitive pixels W in the same row and the multiple first color light-sensitive pixels B in the same row; a third category subunit UC includes multiple panchromatic light-sensitive pixels W and multiple third color light-sensitive pixels C, with the multiple panchromatic light-sensitive pixels W in the same column and the multiple third color light-sensitive pixels C in the same column. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Therefore, as shown in FIG. 11, in the same smallest repeating unit, it may be that the multiple light-sensitive pixels 110 in the same row within part of the subunits are light-sensitive pixels 110 of the same category, and the multiple light-sensitive pixels 110 in the same column within the remaining part of the subunits are light-sensitive pixels 110 of the same category.

Figure 12:
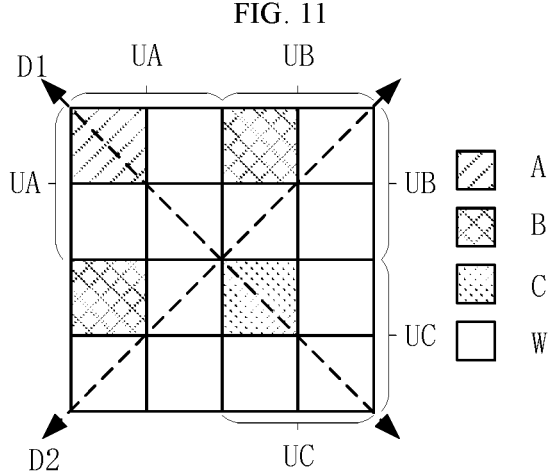
FIG. 12 is a schematic view of an arrangement of a smallest repeating unit in a pixel array according to still another embodiment of the present disclosure.

For example, FIG. 12 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| A | W | B | W |
|---|---|---|---|
| W | W | W | W |
| B | W | C | W |
| W | W | W | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 12, each subunit contains only one color light-sensitive pixel among the four light-sensitive pixels 110. In each smallest repeating unit, the color light-sensitive pixel may be disposed at any position of the subunit (e.g., in the upper left corner of the subunit as shown in FIG. 12).

As shown in FIG. 12, the subunits include three categories. A first category subunit UA includes multiple panchromatic light-sensitive pixels W and a first color light-sensitive pixel A; a second category subunit UB includes multiple panchromatic light-sensitive pixels W and a second color light-sensitive pixel B; and a third category subunit UC includes multiple panchromatic light-sensitive pixels W and a third color light-sensitive pixel C. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 13:
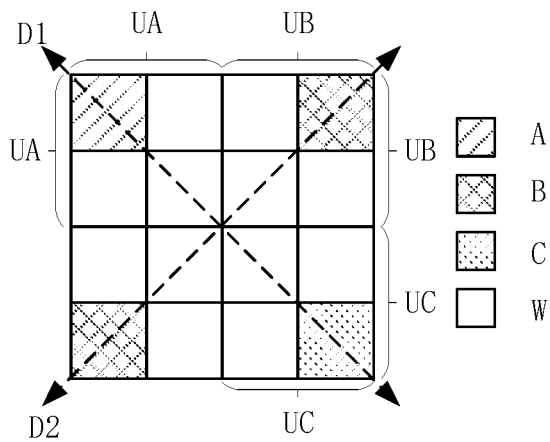
FIG. 13 is a schematic view of an arrangement of a smallest repeating unit in a pixel array according to still another embodiment of the present disclosure.

For example, FIG. 13 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| A | W | W | B |
|---|---|---|---|
| W | W | W | W |
| W | W | W | W |
| B | W | W | C |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 13, each subunit contains only one color light-sensitive pixel among the four light-sensitive pixels 110. In each smallest repeating unit, the color light-sensitive pixel may be disposed at any position of the subunit (e.g., at the upper left corner position, the lower left corner position, the upper right corner position, or the lower right corner position of the subunit as shown in FIG. 12).

As shown in FIG. 13, the subunits include three categories. A first category subunit UA includes multiple panchromatic light-sensitive pixels W and a color first color light-sensitive pixel A; a second category subunit UB includes multiple panchromatic light-sensitive pixels W and a second color light-sensitive pixel B; and a third category subunit UC includes multiple panchromatic light-sensitive pixels W and a third color light-sensitive pixel C. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 14:
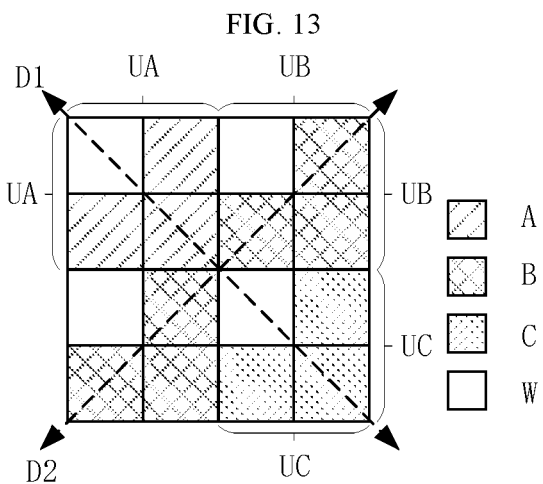
FIG. 14 is a schematic view of an arrangement of a smallest repeating unit in a pixel array according to still another embodiment of the present disclosure.

For example, FIG. 14 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| W | A | W | B |
|---|---|---|---|
| A | A | B | B |
| W | B | W | C |
| B | B | C | C |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 14, each subunit contains only one panchromatic light-sensitive pixel W among the four light-sensitive pixels 110. In each smallest repeating unit, the panchromatic light-sensitive pixel W may be disposed at any position of the subunit (e.g., in the upper left corner of the subunit as shown in FIG. 14).

As shown in FIG. 14, the subunits include three categories. A first category subunit UA includes a panchromatic light-sensitive pixel W and multiple first color light-sensitive pixels A; a second category subunit UB includes a panchromatic light-sensitive pixel W and multiple second color light-sensitive pixels B; and a third category subunit UC includes a panchromatic light-sensitive pixel W and multiple third color light-sensitive pixels C. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

Figure 15:
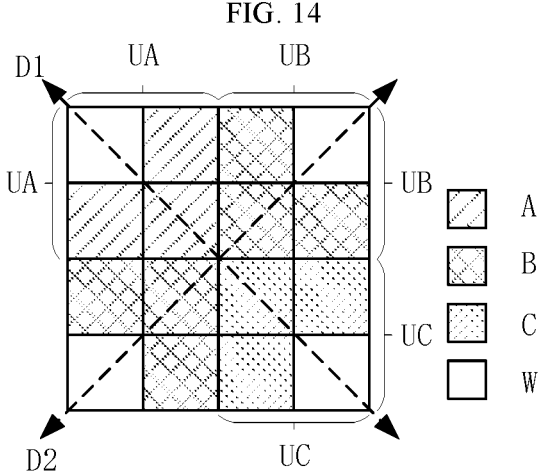
FIG. 15 is a schematic view of an arrangement of a smallest repeating unit in a pixel array according to still another embodiment of the present disclosure.

For example, FIG. 15 is a schematic view of an arrangement of the light-sensitive pixels 110 (shown in FIG. 3) in a smallest repeating unit according to another embodiment of the present disclosure. The smallest repeating unit includes 16 light-sensitive pixels 110 in 4 rows and 4 columns, and each subunit includes 4 light-sensitive pixels 110 in 2 rows and 2 columns. The arrangement is as follows.

| W | A | B | W |
|---|---|---|---|
| A | A | B | B |
| B | B | C | C |
| W | B | C | W |

W denotes a panchromatic light-sensitive pixel W; A denotes a first color light-sensitive pixel in the multiple color light-sensitive pixels; B denotes a second color light-sensitive pixel in the multiple color light-sensitive pixels; and C denotes a third color light-sensitive pixel in the multiple color light-sensitive pixels.

As shown in FIG. 15, each subunit contains only one panchromatic light-sensitive pixel W among the four light-sensitive pixels 110. In each smallest repeating unit, the panchromatic light-sensitive pixel W may be disposed at any position of the subunit (e.g., at the top left corner position, the bottom left corner position, the top right corner position, or the bottom right corner position of the subunit as shown in FIG. 15).

As shown in FIG. 15, the subunits include three categories. A first category subunit UA includes a panchromatic light-sensitive pixel W and multiple first color light-sensitive pixels A; a second category subunit UB includes a panchromatic light-sensitive pixel W and multiple second color light-sensitive pixels B; and a third category subunit UC includes a panchromatic light-sensitive pixel W and multiple third color light-sensitive pixels C. Each smallest repeating unit includes four subunits, one first category subunit UA, two second category subunit UB, and one third category subunit UC, respectively; where the first category subunit UA and the third category subunit UC are arranged in a first diagonal direction D1, and the two second category subunits UB are arranged in a second diagonal direction D2. The first diagonal direction D1 is different from the second diagonal direction D2. For example, the first diagonal direction D1 and the second diagonal direction D2 are perpendicular to each other.

In some embodiments, the first color light-sensitive pixel A may be a red light-sensitive pixel R; the second color light-sensitive pixel B may be a green light-sensitive pixel G; and the third color light-sensitive pixel C may be a blue light-sensitive pixel Bu, in the smallest repeating unit as shown in FIGS. 5-15.

In some embodiments, the first color light-sensitive pixel A may be a red light-sensitive pixel R; the second color light-sensitive pixel B may be a yellow light-sensitive pixel Y; and the third color light-sensitive pixel C may be a blue light-sensitive pixel Bu, in the smallest repeating unit as shown in FIGS. 5-15.

In some embodiments, the first color light-sensitive pixel A may be a magenta light-sensitive pixel M; the second color light-sensitive pixel B may be a cyan light-sensitive pixel Cy; and the third color light-sensitive pixel C may be a yellow light-sensitive pixel Y, in the smallest repeating unit as shown in FIGS. 5-15.

It is noted that in some embodiments, the response band of the panchromatic light-sensitive pixel W may be a visible light band (e.g., 400 nm-760 nm). For example, the panchromatic light-sensitive pixel W is arranged with an infrared filter to enable filtering of infrared light. In other embodiments, the response band of the panchromatic light-sensitive pixel W is a visible light band and a near-infrared band (e.g., 400 nm-1000 nm), matching the response band of the photoelectric conversion element 1111 (shown in FIG. 4) in the image sensor 10 (shown in FIG. 1). For example, the panchromatic light-sensitive pixel W may be arranged without a filter or with a filter that allows light of all wavelengths to pass, and the response wavelength of the panchromatic light-sensitive pixel W is determined by the response wavelength of the photoelectric conversion element 1111, i.e., the two response wavelengths are matched. The embodiments of the present disclosure include, but are not limited to, the above band range.

Figure 16:
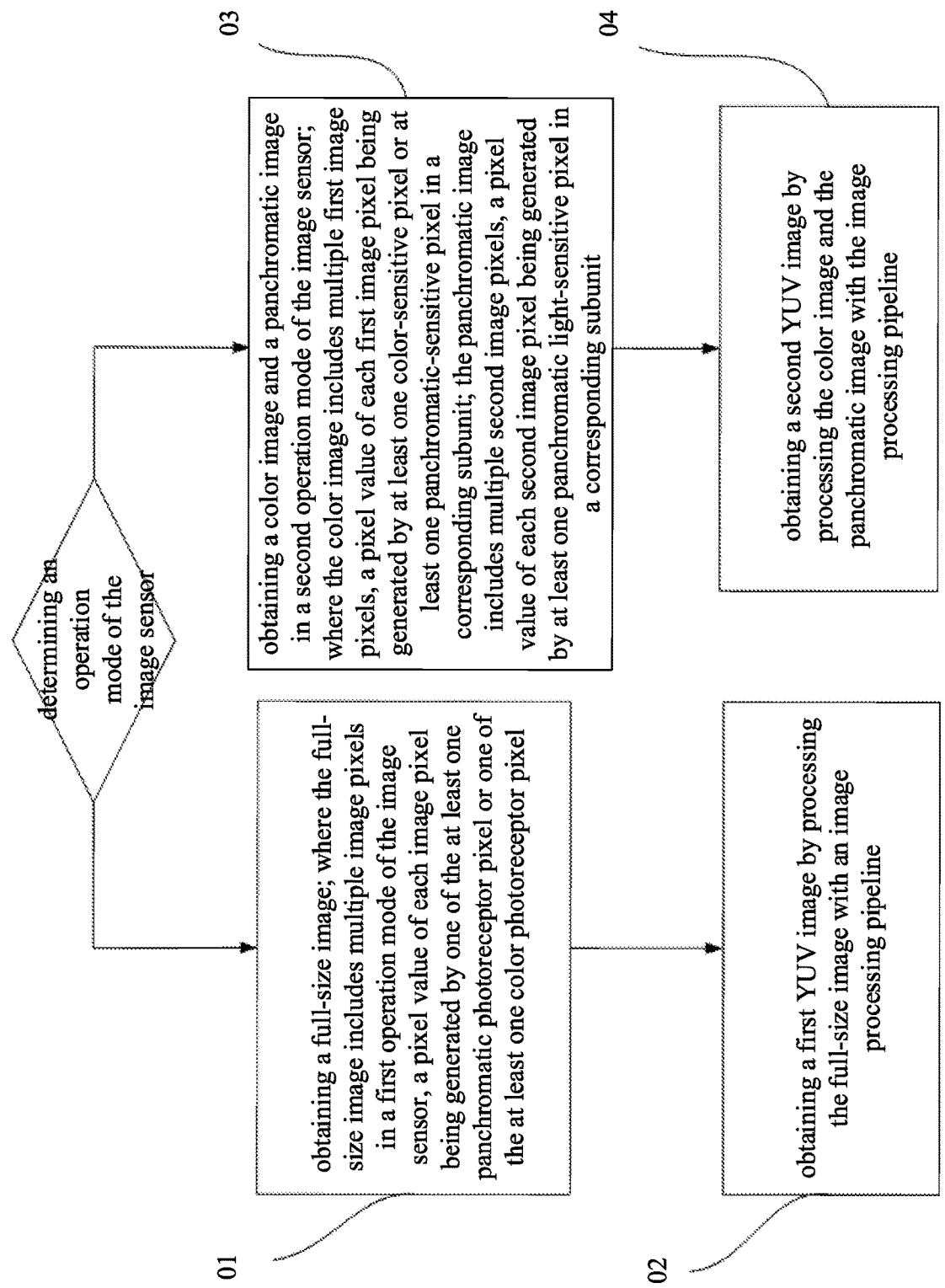
FIG. 16 is a flowchart of an image processing method according to an embodiment of the present disclosure.

Referring to FIG. 16, the present disclosure discloses an image processing method applied to an image sensor 10. The image sensor 10 includes a pixel array 11, the pixel array 11 including multiple subunits, each subunit including at least one panchromatic light-sensitive pixel and at least one color light-sensitive pixel. The color light-sensitive pixel has a narrower spectral response than the panchromatic light-sensitive pixel. The image processing method includes the following operations illustrated at blocks.

At block 01: obtaining a full-size image; where the full-size image includes multiple image pixels in a first operation mode of the image sensor 10, a pixel value of each image pixel being generated by one of the at least one panchromatic photoreceptor pixel or one of the at least one color photoreceptor pixel.

At block 02: obtaining a first YUV image by processing the full-size image with an image processing pipeline.

At block 03: obtaining a color image and a panchromatic image in a second operation mode of the image sensor 10; where the color image includes multiple first image pixels, a pixel value of each first image pixel being generated by at least one color-sensitive pixel or at least one panchromatic-sensitive pixel in a corresponding subunit; the panchromatic image includes multiple second image pixels, a pixel value of each second image pixel being generated by at least one panchromatic light-sensitive pixel in a corresponding subunit.

At block 04: obtaining a second YUV image by processing the color image and the panchromatic image with the image processing pipeline.

Referring to FIG. 1 and FIG. 16 together, the image processing method of the present embodiments may be implemented in the camera assembly 100 of the present embodiments. The camera assembly 100 includes an image sensor 10 and a processor 20. The image sensor 10 includes a pixel array 11, and the pixel array 11 includes multiple subunits, each subunit including at least one panchromatic light-sensitive pixel W and at least one color light-sensitive pixel; each color light-sensitive pixel has a narrower spectral response than each panchromatic light-sensitive pixel W. The steps 01, 02, 03, and 04 may be all achieved by the processor. That is, the processor 20 is configured to obtain a full-size image; where the full-size image includes multiple image pixels in a first operation mode of the image sensor 10, a pixel value of each image pixel being generated by one of the at least one panchromatic photoreceptor pixel or one of the at least one color photoreceptor pixel; to obtain a first YUV image by processing the full-size image with an image processing pipeline; to obtain a color image and a panchromatic image in a second operation mode of the image sensor 10; where the color image includes multiple first image pixels, a pixel value of each first image pixel being generated by at least one color-sensitive pixel or at least one panchromatic-sensitive pixel in a corresponding subunit; the panchromatic image includes multiple second image pixels, a pixel value of each second image pixel being generated by at least one panchromatic light-sensitive pixel in a corresponding subunit; and to obtain a second YUV image by processing the color image and the panchromatic image with the image processing pipeline.

The full-size image, the color image, and the panchromatic image are processed through the image processing pipeline to obtain the first YUV image and the second YUV image, respectively. Since the pixel values corresponding to the panchromatic light-sensitive pixels are processed during the image processing, the pixel values corresponding to the panchromatic light-sensitive pixels can be utilized to improve the signal-to-noise ratio and sharpness of the YUV image.

Figure 17:
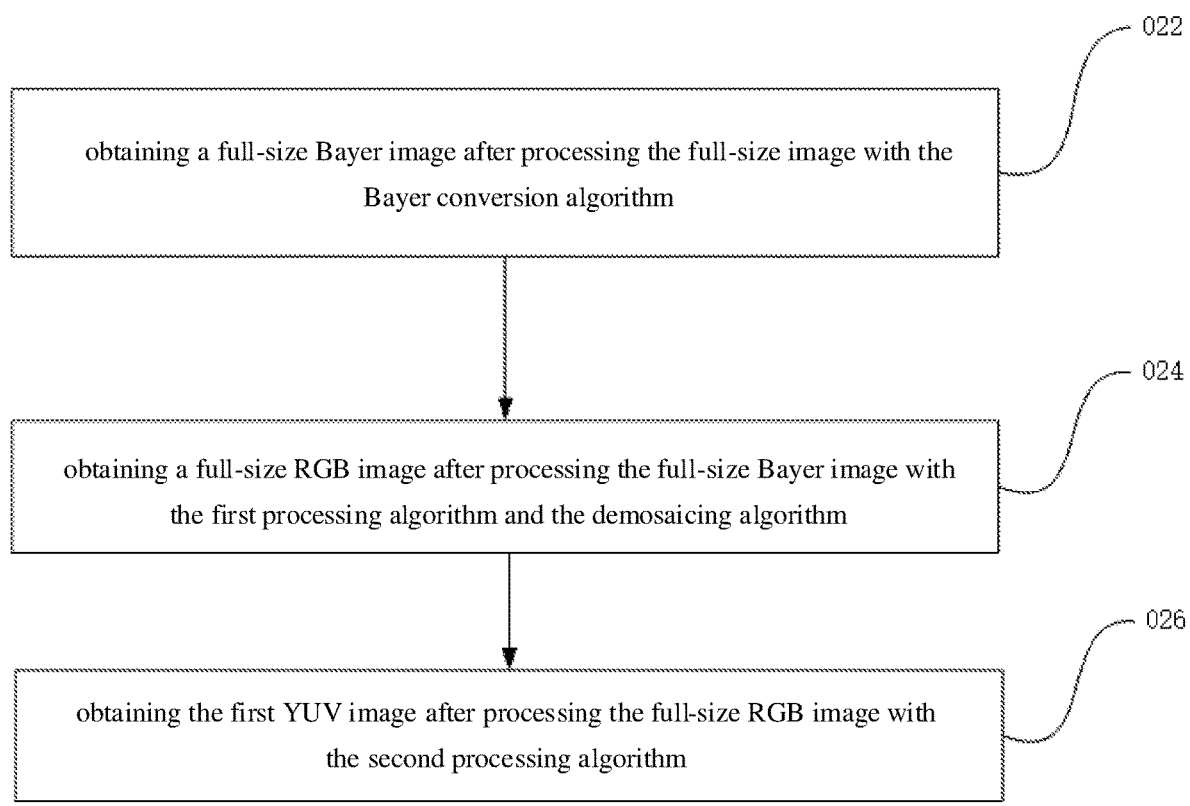
FIG. 17 is a flowchart of an image processing method according to another embodiment of the present disclosure.

Referring to FIG. 17, in some embodiments, the image processing pipeline includes a Bayer conversion algorithm, a first processing algorithm, a demosaicing algorithm, and a second processing algorithm. The obtaining a first YUV image by processing the full-size image with an image processing pipeline includes the following operations.

At block 022: obtaining a full-size Bayer image after processing the full-size image with the Bayer conversion algorithm.

At block 024: obtaining a full-size RGB image after processing the full-size Bayer image with the first processing algorithm and the demosaicing algorithm.

At block 026: obtaining the first YUV image after processing the full-size RGB image with the second processing algorithm.

In some implementations, steps 022, 024, and 026 may all be implemented by processor 20. That is, the processor 20 is configured to obtain a full-size Bayer image after processing the full-size image with the Bayer conversion algorithm; to obtain a full-size RGB image after processing the full-size Bayer image with the first processing algorithm and the demosaicing algorithm; and to obtain the first YUV image after processing the full-size RGB image with the second processing algorithm.

Figure 18:
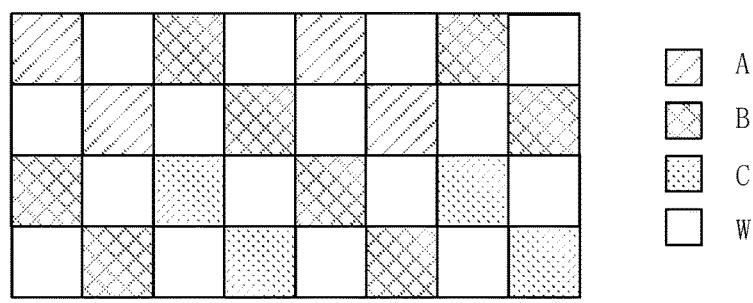
FIG. 18 is a schematic view of a full-size image according to an embodiment of the present disclosure.

Referring to FIG. 18, in some embodiments, the full-size image includes a color light-sensitive pixel and a panchromatic-sensitive pixel W. The processor 20 is configured to obtain a full-size Bayer image after processing the full-size image with the Bayer conversion algorithm. The full-size Bayer image includes multiple full-size Bayer image pixels, a pixel value of each full-size Bayer image pixel being generated from the color light-sensitive pixel or the panchromatic-sensitive pixel. In an example, the Bayer conversion algorithm may be: processing the panchromatic light-sensitive pixel W in the full-size image to convert to a first color pixel; processing a second color pixel and a third color pixel to convert to the first color pixel to obtain a first color intermediate image; processing the first color intermediate image based on the full-size image to obtain a second color intermediate image and a third color intermediate image, and fusing the first color intermediate image, the second color intermediate image, and the third color intermediate image to obtain a first target image, where the first target image includes multiple pixels arranged in a Bayer array, such that the full-size Bayer image can be obtained after processing. The full-size RGB image is obtained after processing the full-size Bayer image with the first processing algorithm and the demosaicing algorithm, and the first YUV image is obtained after processing the full-size RGB image with the second processing algorithm.

Figure 19:
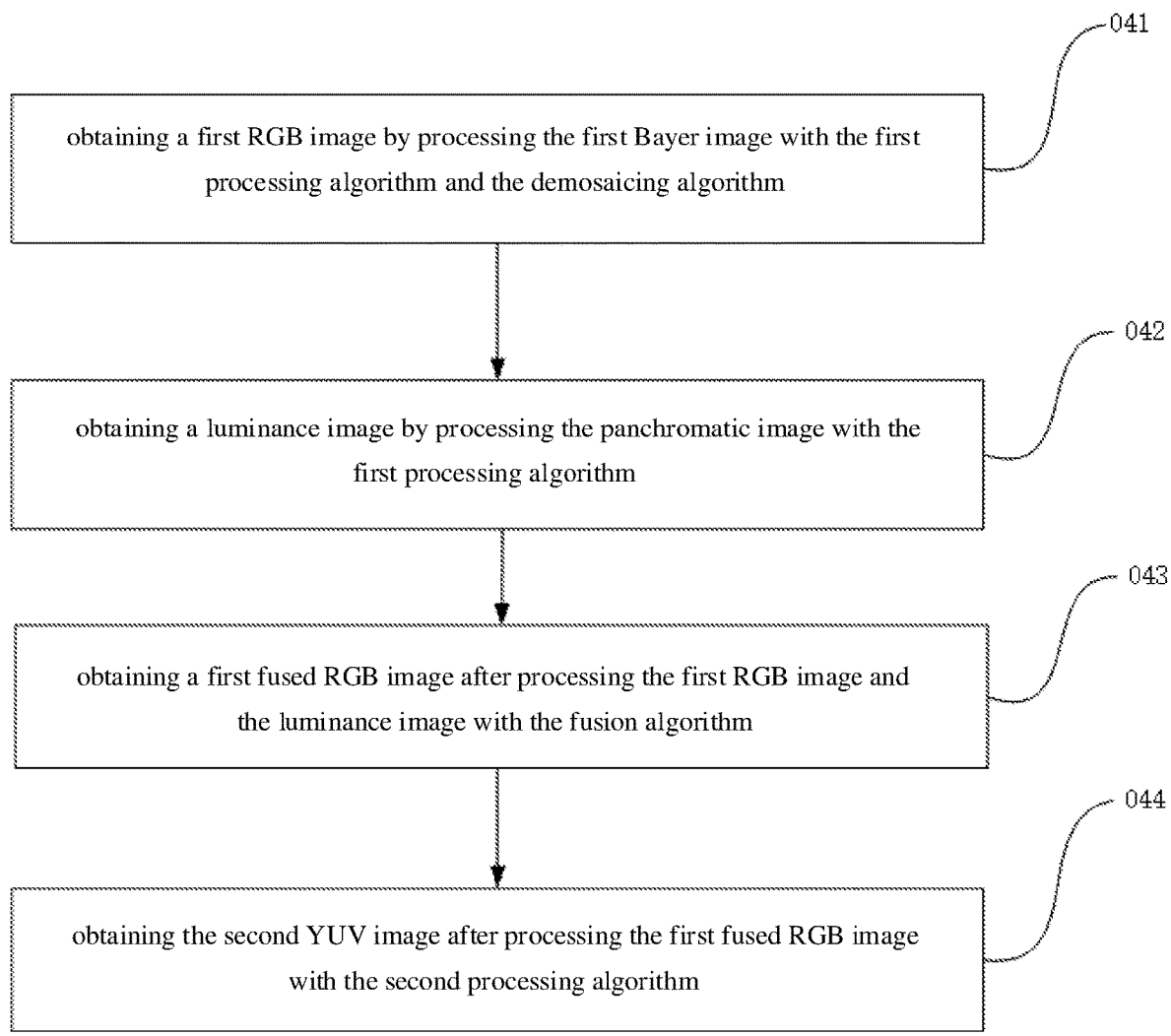
FIG. 19 is a flowchart of an image processing method according to an embodiment of the present disclosure.

Referring to FIG. 19, in some embodiments, the color image includes a first Bayer image, the pixel value of each first image pixel of the first Bayer image being generated by at least one color light-sensitive pixel in a corresponding subunit; the image processing pipeline includes a first processing algorithm, a demosaicing algorithm, a fusion algorithm, and a second processing algorithm. The obtaining a second YUV image by processing the color image and the panchromatic image with the image processing pipeline includes the following operations.

At block 041: obtaining a first RGB image by processing the first Bayer image with the first processing algorithm and the demosaicing algorithm.

At block 042: obtaining a luminance image by processing the panchromatic image with the first processing algorithm.

At block 043: obtaining a first fused RGB image after processing the first RGB image and the luminance image with the fusion algorithm.

At block 044: obtaining the second YUV image after processing the first fused RGB image with the second processing algorithm.

In some embodiments, steps 041, 042, 043, and 044 may all be implemented by processor 20.

That is, the processor 20 is configured to obtain a first RGB image by processing the first Bayer image with the first processing algorithm and the demosaicing algorithm; to obtain a luminance image by processing the panchromatic image with the first processing algorithm; to obtain a first fused RGB image after processing the first RGB image and the luminance image with the fusion algorithm; and to obtain the second YUV image after processing the first fused RGB image with the second processing algorithm.

Specifically, the image processing pipeline includes a first processing algorithm, a demosaicing algorithm, a fusion algorithm, and a second processing algorithm. The first RGB image is obtained after processing the first Bayer image with the first processing algorithm and the demosaicing algorithm. The first RGB image can be obtained after processing the first Bayer image by the image processing pipeline. The luminance image (grayscale image) is obtained after processing the panchromatic image with the first processing algorithm through the image processing pipeline. In the present embodiments, the processor 20 may further include a fusion image processor, and the first fusion RGB image is obtained after processing the first RGB image and the luminance image and the second YUV image is obtained after processing the first fusion RGB image with the second processing algorithm through the fusion image processor.

In particular, the fusion algorithm for the first fused RGB image includes processing the first Bayer image with the first processing algorithm and the demosaicing algorithm to obtain the first RGB image, and processing the panchromatic image with the first processing algorithm to obtain the luminance image, and then fusing the first RGB image and the luminance image to obtain the first fused RGB image with a high signal-to-noise ratio. The format of the first fused RGB image is substantially the same as that of the first RGB image, and the first fused RGB image can be processed by the image pipeline. Therefore, the image pipeline can be applied to implement the second processing algorithm for the first fused RGB image. The fusion of the first RGB image and the luminance image may be implemented by a fusion module (RGBW fusion), and the fusion may be performed by bilateral filtering of the R image, G image, and B image respectively, with the luminance image as a reference image to obtain the fused RGB image.

Specifically, the R image, the G image, and the B image may be filtered to obtain a first filtered image of the R image, a first filtered image of the G image, and a first filtered image of the B image. Taking the R image as an example, the R image includes an R image first to-be-filtered image pixel and an R image first to-be-filtered region, and the R image first to-be-filtered image pixel is disposed within the R image first to-be-filtered region. The luminance image includes a first reference image pixel and a first reference region, and the first reference image pixel corresponds to the R image first to-be-filtered image pixel and the first reference region corresponds to the R image first to-be-filtered region. Subsequently, weights of the multiple pixels in the first reference region relative to the first reference image are calculated, and the weights include weights in a spatial domain and weights in a pixel range domain. Then the pixel values of the first to-be-filtered image pixels of the R image are corrected to obtain the first filtered image data of the R image based on the weights of the multiple first image pixels and the pixel values of the pixel points corresponding to the R image first to-be-filtered region. In this way, the first filtered image of the G image and the first filtered image of the B image can be obtained in a manner similar to that of the embodiments. Therefore, it is possible to obtain the fused RGB image by the bilateral filtering processing.

Figure 20:
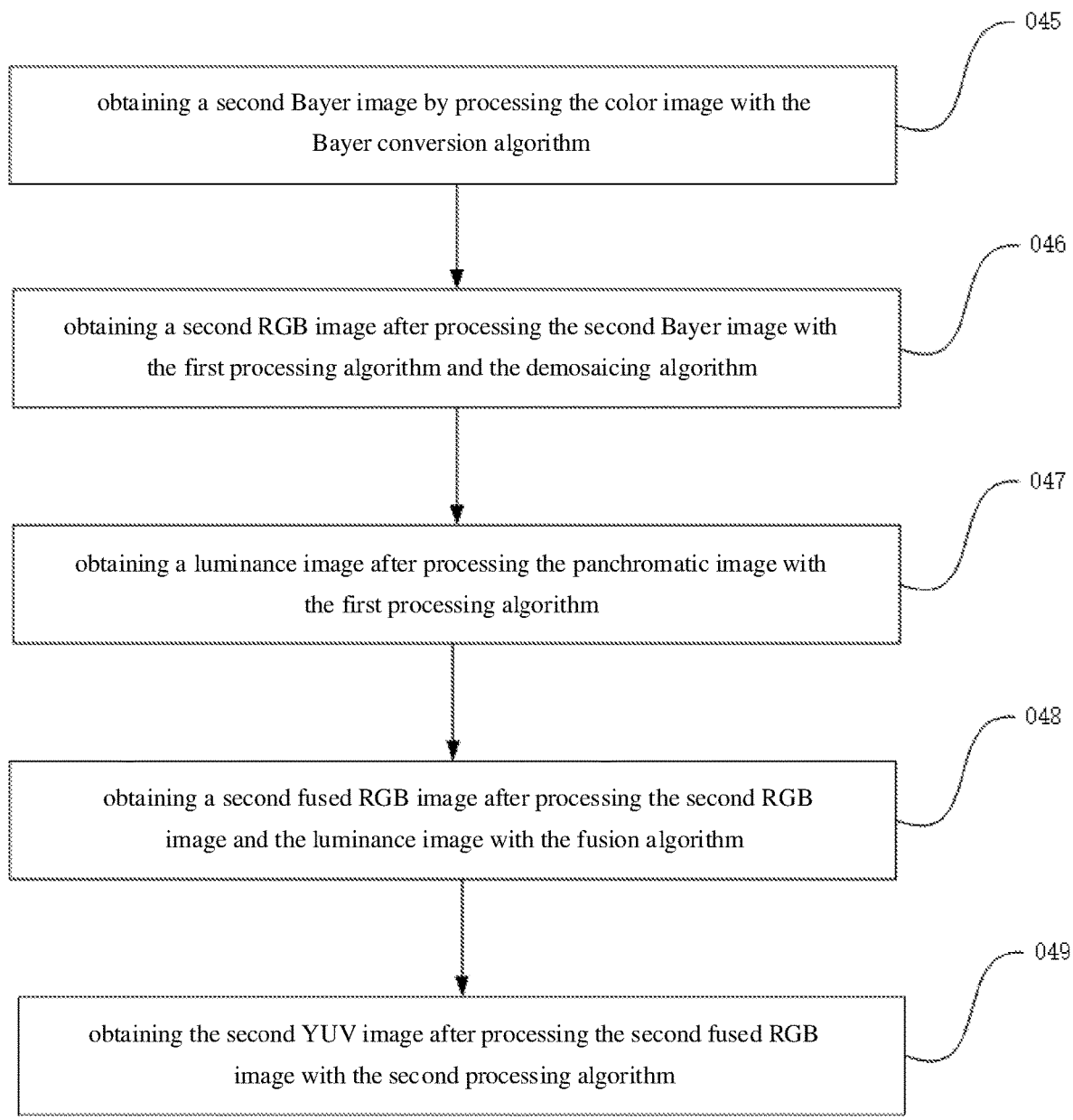
FIG. 20 is a flowchart of an image processing method according to an embodiment of the present disclosure.

Referring to FIG. 20, in some embodiments, the image processing pipeline includes a Bayer conversion algorithm, a first processing algorithm, a demosaicing algorithm, a fusion algorithm, and a second processing algorithm. The obtaining a second YUV image by processing the color image and the panchromatic image with the image processing pipeline includes the following operations.

At block 045: obtaining a second Bayer image by processing the color image with the Bayer conversion algorithm.

At block 046: obtaining a second RGB image after processing the second Bayer image with the first processing algorithm and the demosaicing algorithm.

At block 047: obtaining a luminance image after processing the panchromatic image with the first processing algorithm.

At block 048: obtaining a second fused RGB image after processing the second RGB image and the luminance image with the fusion algorithm.

At block 049: obtaining the second YUV image after processing the second fused RGB image with the second processing algorithm.

In some implementations, steps 045, 046, 047, 048, and 049 may be implemented by processor 20. That is, the processor 20 is configured to obtain a second Bayer image by processing the color image with the Bayer conversion algorithm; to obtain a second RGB image after processing the second Bayer image with the first processing algorithm and the demosaicing algorithm; to obtain a luminance image after processing the panchromatic image with the first processing algorithm; to obtain a second fused RGB image after processing the second RGB image and the luminance image with the fusion algorithm; and to obtain the second YUV image after processing the second fused RGB image with the second processing algorithm.

Figure 21:
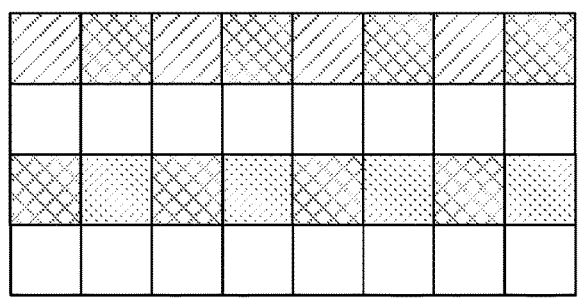
FIG. 21 is a schematic view of a color image according to an embodiment of the present disclosure.

Referring to FIG. 21, the image processing pipeline includes a Bayer conversion algorithm, a first processing algorithm, a demosaicing algorithm, a fusion algorithm, and a second processing algorithm. In some embodiments, the image processing pipeline further includes a Bayer conversion algorithm, and the Bayer conversion algorithm may process the color image to obtain a second Bayer image. The color image may be an image as shown in FIG. 21, such as a first row of pixel values generated from at least one color light-sensitive pixel in a subunit and a second row of pixel values generated (summed or averaged) from at least one panchromatic light-sensitive pixel in a subunit. In some embodiments, the color image shown in FIG. 21 may be extracted from odd rows as a first Bayer image and from even rows as a panchromatic image. The color image may be processed by the image processing pipeline to obtain a second Bayer image of which pixel values are generated by at least one color light-sensitive pixel in a subunit. The second RGB image is obtained after processing the second Bayer image with the first processing algorithm and the demosaicing algorithm, and the second RGB image is a Bayer image of the conventional Bayer array.

Specifically, the second Bayer image is obtained after processing the color image with the Bayer conversion algorithm, the second RGB image is obtained after processing the second Bayer image with the first processing algorithm and the demosaicing algorithm, and the luminance image (grayscale image) is obtained after processing the panchromatic image with the first processing algorithm through the image processing pipeline. In an example, the Bayer conversion algorithm may be: processing the panchromatic pixels in the color image to convert to first color processing pixels; processing second color processing pixels and third color processing pixels to convert to the first color processing pixels to obtain a first color processing image; processing the first color processing image based on the color image to obtain a second color processing image and a third color processing image; and fusing the first color processing image, the second color processing image, and the third color processing image to obtain a second target image, the second target image including pixels arranged in a Bayer array, such that the processed second Bayer image can be obtained. In the present embodiments, the processor 20 may further include a fusion image processor, and the second fused RGB image is obtained after processing the second RGB image and the luminance image and the second YUV image is obtained after processing the first fused RGB image with the second processing algorithm through the fusion image processor.

Figure 22:
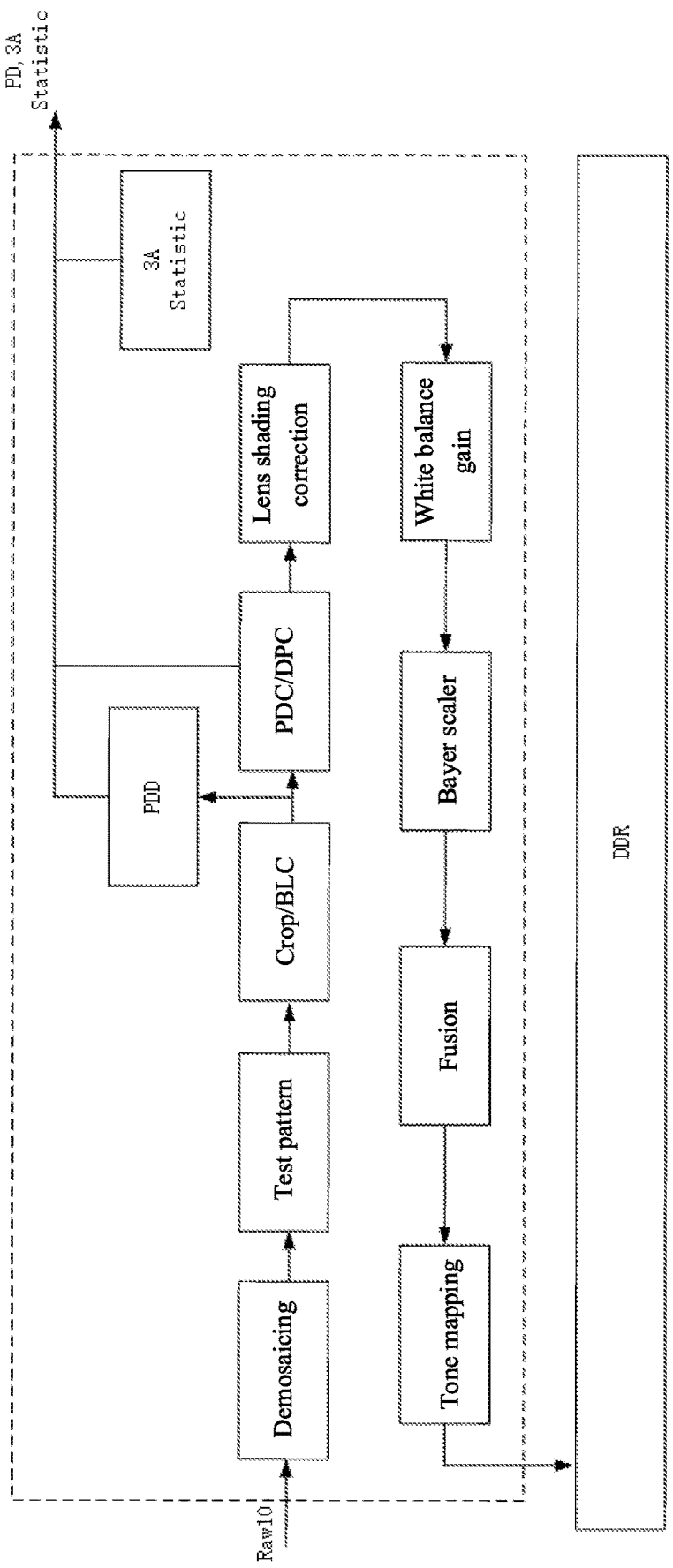
FIG. 22 is a principle schematic view of an image processing method according to an embodiment of the present disclosure.
Figure 23:
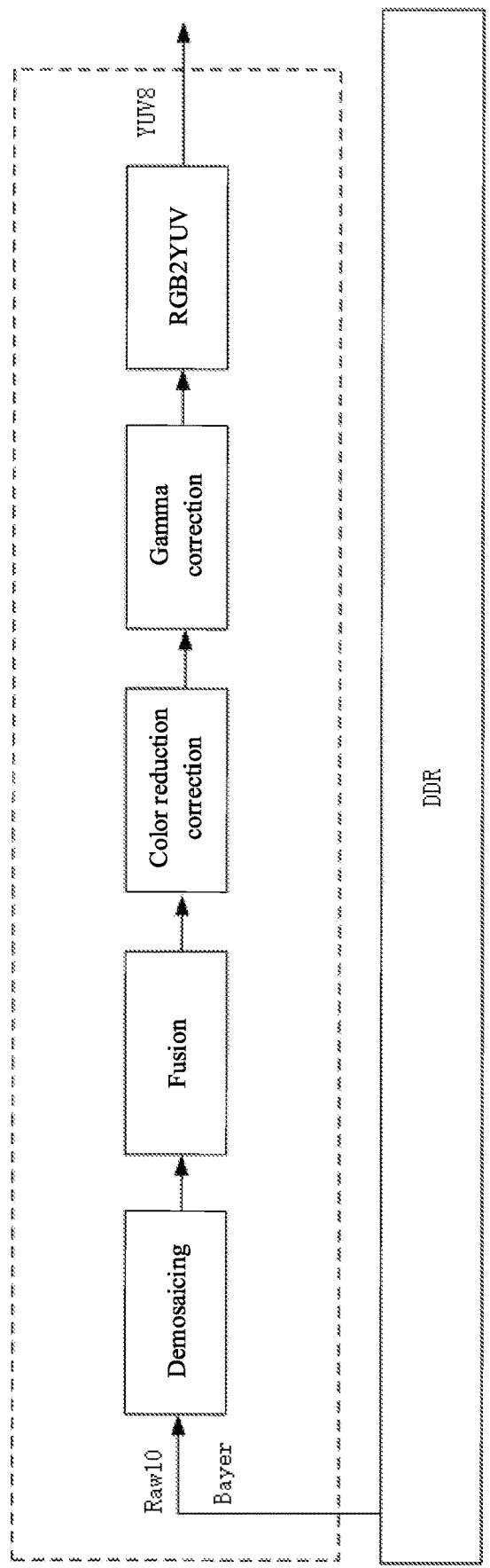
FIG. 23 is a principle schematic view of an image processing method according to an embodiment of the present disclosure.

Referring to FIG. 22 and FIG. 23 together, in some embodiments, the first processing algorithm includes at least one of: Test pattern, image segmentation preprocessing (Crop)/Black Level Correction (BLC), Phase difference pixel correction/Defect pixel correction (PDC/DPC), Lens shading correction (LSC), White balance gain (WBG), Bayer Scaler (BSC), Fusion, and Tone mapping (TMP). The second processing algorithm includes at least one of: color reduction correction (CMX), gamma correction (GMA), RGB domain to YUV domain (RGB2YUV).

Referring again to FIG. 22, specifically, the test pattern may generate a fixed test pattern to verify the image processing pipeline at the back end to ensure that the image processing pipeline can process the data properly. The Crop may be performed on the input image before feature extraction, segmentation, and matching, with the main purpose of improving the reliability of feature extraction, image segmentation, matching, and recognition by eliminating irrelevant information in the image, recovering useful real information, enhancing the detectability of relevant information, and maximizing data simplification. Since the circuitry of the image sensor 10 itself can have a dark current, resulting in a certain output voltage of the pixels even when there is no light illumination, it is necessary to subtract the effect caused by the dark current, that is, to perform black level correction. The LSC is to solve the problem of shading around the lens due to the optical characteristics of the lens, that is, the lens for the optical refraction unevenly caused by the lens around the shadow situation. As the lens itself is a convex lens, due to the principle of convex lens, the center is necessarily more light-sensitive than the periphery, and the edge area of an image area of the image sensor 10 receives less light intensity than the center, which causes the phenomenon of the brightness inconsistency at the center and the four corners. The fusion can improve spatial resolution and spectral resolution with distinctly salient information and low noise.

The demosaicing algorithm can interpolate the Bayer image of the Bayer array into an RGB image, where the RGB image may be three frames, i.e., the R image, the G image, and the B image obtained after interpolation, respectively.

Referring again to FIG. 23, the second processing algorithm includes at least one of: color reduction correction (CMX), gamma correction (GMA), and conversion of RGB domain to YUV domain.

The CMX is to correct the color of the image such that the color of the image becomes accurate. The GMA can make the image look more in line with the characteristics of the human eye. The gamma correction formula is, for example, Out=In$^{gamma}$ or Out=In$^{1/gamma}$, where In indicates the input image and Out indicates the output image. The RGB2YUV is an algorithm for converting an RGB format image to a YUV format image.

Figure 24:
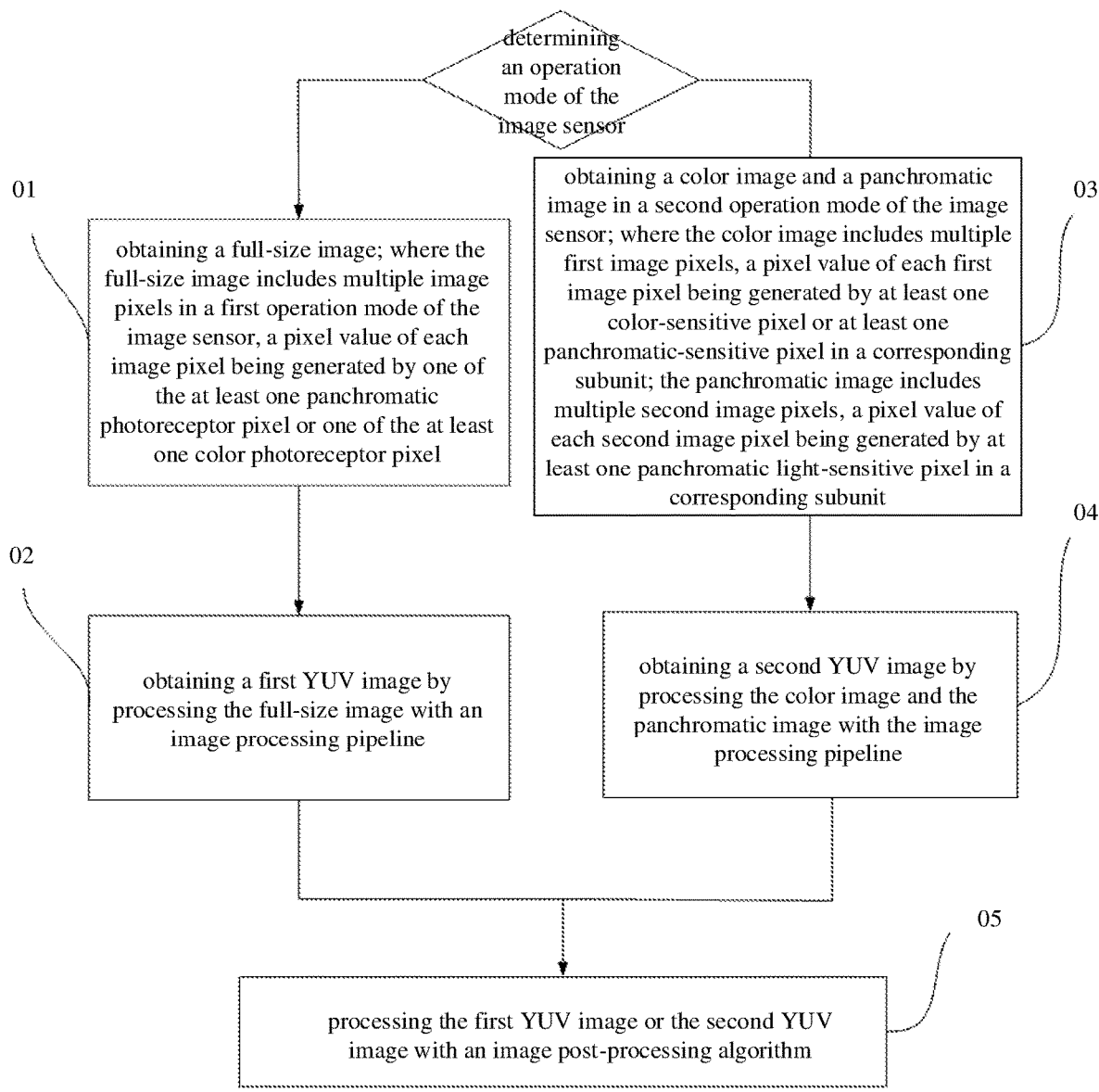
FIG. 24 is a flowchart of an image processing method according to an embodiment of the present disclosure.

Referring to FIG. 24, in some embodiments, the image processing method further includes the following operations.

At block 05: processing the first YUV image or the second YUV image with an image post-processing algorithm.

In some embodiments, step 05 may be implemented by the processor 20, i.e., the processor 20 is configured to process the first YUV image or the second YUV image with an image post-processing algorithm.

Specifically, after performing the Bayer conversion algorithm, the first processing algorithm, the demosaicing algorithm, and the second processing algorithm on the image, the image post-processing algorithm may be performed on the first YUV image or the second YUV image, thereby making the output image more accurate.

In some implementations, the image processing method is implemented through an image pipeline. The image pipeline includes an image processing engine (IPE), which is configured to implement image post-processing algorithms.

In some implementations, the image post-processing algorithm includes at least one of: image correction and adjustment (ICA), advanced noise reduction, temporal filter, Chromatic Aberration Correction (CAC), color space transform, local tone mapping, color correction, gamma correction, 2D Look-Up Table (2D LUT), color adjustment and chroma enhancement (CV&Chroma enhancement), chroma suppression, Adaptive Spatial Filter (ASF), up scaler, grain adder, and down scaler.

Figure 25:
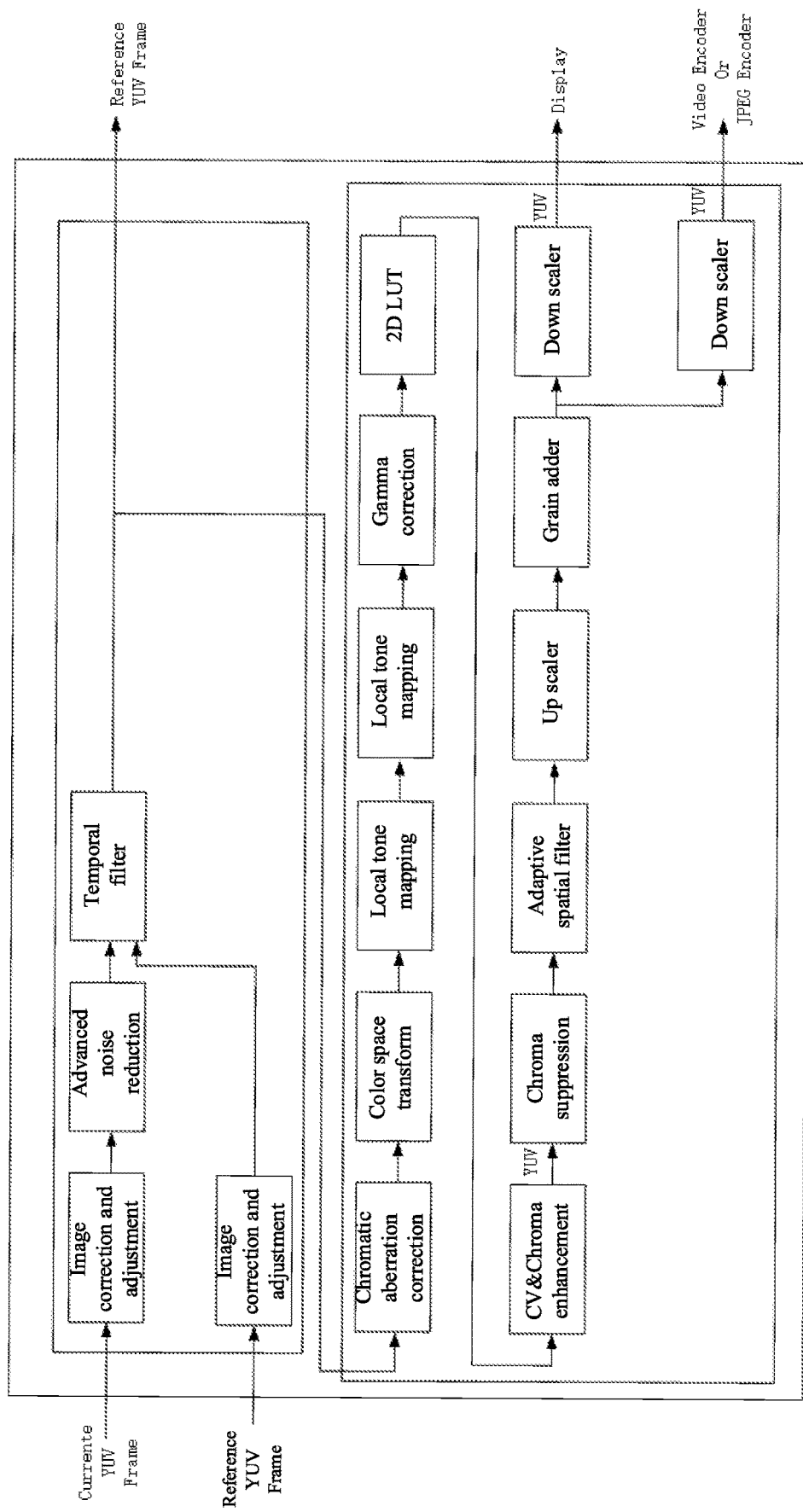
FIG. 25 is a principle schematic view of an image processing method according to an embodiment of the present disclosure.

Referring to FIG. 25, specifically, the image processing engine may include a noise processing section and a post-processing section. The image post-processing algorithms include at least one of: ICA, advanced noise reduction, temporal filter, CAC, color space transform, local tone mapping, color correction, gamma correction, 2D LUT, CV&Chroma enhancement, chroma suppression, ASF, up scaler, grain adder, and down scaler. The ICA, advanced noise reduction, and temporal filter may be implemented by the noise processing section. The CAC, color space transform, local tone mapping, color correction, gamma correction, 2D LUT, CV&Chroma enhancement, chroma suppression, ASF, up scaler, grain adder, and down scaler may be implemented by the post-processing section.

The ICA refers to the restorative processing of distorted images. The ICA is divided into two main categories: geometric correction and grayscale correction. The ICA can be done in three aspects: level, color, and sharpness. The ICA can be performed twice. The ICA may include a first ICA and a second ICA, where the first ICA is configured to process the current YUV frame and the second ICA is configured to process the reference YUV frame. The current YUV frame, after being processed by the first ICA, may be processed with advanced noise reduction and temporal filter. The advanced noise reduction can reduce the noise of the image, thereby improving the signal-to-noise ratio of the image. The temporal filter is configured to smooth the image. The CAC is configured to correct the color of the image such that the color of the image becomes accurate. The local tone mapping, refers to a method where the mapped grayscale values of pixels may be different depending on their location, and the mapping results of pixel points are influenced by other factors. The 2D LUT is configured to color restore the grayscale mode of the screen, and also to establish a correspondence between two sets of data, which can be used for color space transform, CCM, luminance mapping, etc. The CV&Chroma enhancement is configured to enhance the chromaticity of the image. The chroma suppression is configured to improve the color effect of translucent areas in the foreground signal, thereby restoring the original color of objects in the foreground (instead of being in a gray or translucent state). Specifically, chroma enhancement enhances color saturation while keeping luminance constant, and chroma suppression suppresses chroma in certain luminance ranges. The ASF is an adaptive spatial filter that filters the image and is configured to enhance sharpness. The up scaler is configured to increase the size of the image and enhance the resolution of the image. The grain adder is a texture increaser, which adds fineness to the image to make the texture information of the image clearer. The down scaler is configured to decrease the size of the image and decrease the resolution of the image. The image obtained after the image post-processing algorithm may be transferred to the display for display or to the video encoder or JPEG encoder for codec processing.

Figure 26:
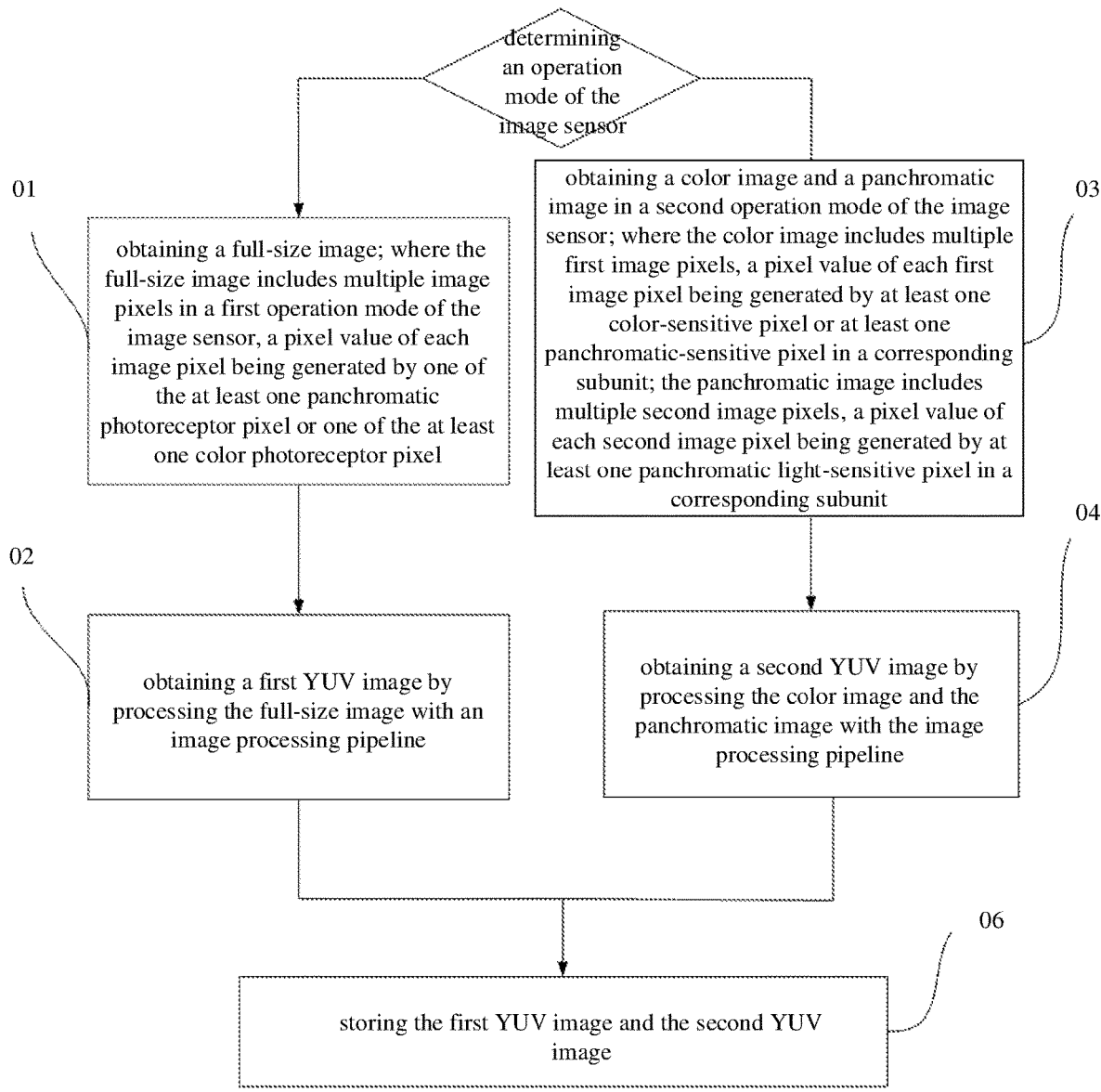
FIG. 26 is a flowchart of an image processing method according to an embodiment of the present disclosure.

Referring to FIG. 26, in some embodiments, the image processing method includes the following operations.

At block 06: storing the first YUV image and the second YUV image.

In some implementations, step 06 may be implemented by the processor 20, i.e., the processor 20 is configured to store the first YUV image and the second YUV image.

Specifically, after processing and obtaining the first YUV image and the second YUV image, the images may be stored in a storage element (e.g., double-rate synchronous dynamic random memory, DDR) such that they can be quickly read from the storage element when they are subsequently needed.

Figure 27:
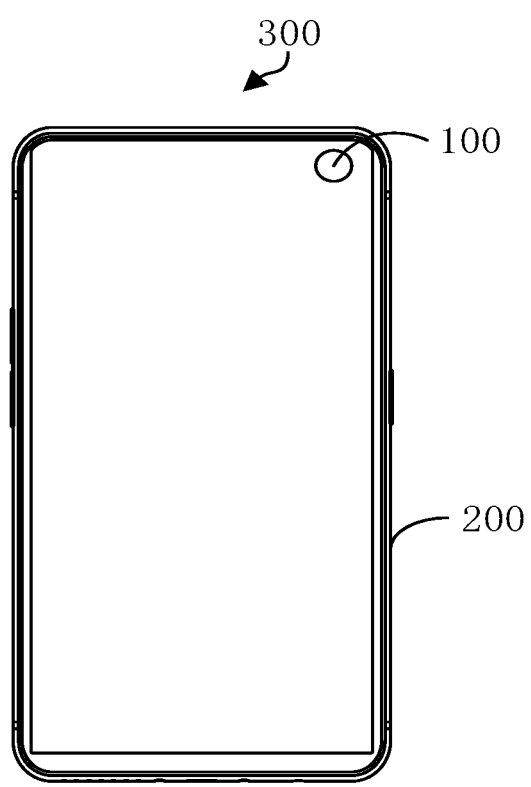
FIG. 27 is a structural schematic view of a mobile terminal according to an embodiment of the present disclosure.

Referring to FIG. 27, the present disclosure further provides a mobile terminal 300. The mobile terminal 300 includes a camera assembly 100 of any of the above embodiments and a housing 200, the camera assembly 100 being arranged on the housing 200. In some embodiments, the housing 200 is defines a mounting hole, and the camera assembly 100 may be arranged in the mounting hole.

The mobile terminal 300 may be mobile phone, tablet, laptop, smart wearable device (e.g., smart watch, smart bracelet, smart glasses, smart helmet), drone, head-up display device, etc., without restriction herein.

The mobile terminal 300 of the embodiments of the present disclosure obtains the first YUV image and the second YUV image by processing the full-size image, the color image, and the panchromatic image, and makes use of the pixel values corresponding to the panchromatic light-sensitive pixels to make the signal-to-noise ratio and sharpness of the image higher.

In the description of this specification, reference to the terms "an embodiment", "some embodiments", "schematic embodiment", "example", "specific example", or "some examples" means that the specific features, structures, materials, or characteristics described in connection with the embodiment or example are included in at least one embodiment or example of the present disclosure. In this specification, the schematic representation of the above terms does not necessarily refer to the same embodiment or example. Moreover, the specific features, structures, materials, or characteristics described may be combined in a suitable manner in any one or more of the embodiments or examples. In addition, without contradicting each other, those skilled in the art may combine different embodiments or examples described in this specification and the features of the different embodiments or examples.

Any process or method description in the flowchart or otherwise described herein may be understood to represent a module, fragment, or portion of code including one or more executable instructions for implementing steps of a particular logical function or process, and the scope of the embodiments of the present disclosure includes additional implementations in which the functions may be performed not in the order shown or discussed, including according to the functions involved in a substantially simultaneous manner or in the reverse order, as should be understood by those skilled in the art to which the embodiments of the present disclosure belong.

Although the embodiments of the present disclosure have been shown and described above, it is understood that the above embodiments are exemplary and are not to be construed as limiting the present disclosure, and that variations, modifications, replacements, and variants of the above embodiments may be made by those skilled in the art within the scope of the present disclosure.

What is claimed is:

1. An image processing method applied to an image sensor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel; the method comprises:

obtaining a full-size image in a first operation mode of the image sensor; wherein the full-size image comprises a plurality of image pixels; the plurality of image pixels comprise color light-sensitive pixels and panchromatic light-sensitive pixels; for each of the plurality of image pixels, the image pixel is a corresponding pixel of the panchromatic light-sensitive pixels and the color light-sensitive pixels, and a pixel value of the image pixel is generated by the corresponding pixel;

obtaining a first YUV image by processing the full-size image with an image processing pipeline;

obtaining a color image and a panchromatic image in a second operation mode of the image sensor; wherein the color image comprises a plurality of first image pixels, a pixel value of each first image pixel being generated by at least one color-sensitive pixel or at least one panchromatic-sensitive pixel in a corresponding subunit; the panchromatic image comprises a plurality of second image pixels, a pixel value of each second image pixel being generated by at least one panchromatic light-sensitive pixel in a corresponding subunit; and obtaining a second YUV image by processing the color image and the panchromatic image with the image processing pipeline.

2. The method according to claim 1, wherein the image processing pipeline comprises a Bayer conversion algorithm, a first processing algorithm, a demosaicing algorithm, and a second processing algorithm; the obtaining a first YUV image by processing the full-size image with an image processing pipeline comprises:

obtaining a full-size Bayer image after processing the full-size image with the Bayer conversion algorithm;

obtaining a full-size RGB image after processing the full-size Bayer image with the first processing algorithm and the demosaicing algorithm; and obtaining the first YUV image after processing the full-size RGB image with the second processing algorithm.

3. The method according to claim 2, wherein the full-size Bayer image comprises a plurality of full-size Bayer image pixels, a pixel value of each full-size Bayer image pixel being generated from one color light-sensitive pixel or one panchromatic-sensitive pixel;

the Bayer conversion algorithm comprises:

processing a panchromatic light-sensitive pixel in the full-size image to convert to a first color pixel;

processing a second color pixel and a third color pixel in the full-size image to convert to the first color pixel, and obtaining a first color intermediate image;

processing the first color intermediate image based on the full-size image to obtain a second color intermediate image and a third color intermediate image, and fusing the first color intermediate image, the second color intermediate image, and the third color intermediate image to obtain the full-size Bayer image; where the full-size Bayer image comprises pixels arranged in a Bayer array.

4. The method according to claim 1, wherein the color image comprises a first Bayer image, the pixel value of each first image pixel of the first Bayer image being generated by at least one color light-sensitive pixel in a corresponding subunit; the image processing pipeline comprises a first processing algorithm, a demosaicing algorithm, a fusion algorithm, and a second processing algorithm; the obtaining a second YUV image by processing the color image and the panchromatic image with the image processing pipeline comprises:

obtaining a first RGB image by processing the first Bayer image with the first processing algorithm and the demosaicing algorithm;

obtaining a luminance image by processing the panchromatic image with the first processing algorithm;

obtaining a first fused RGB image after processing the first RGB image and the luminance image with the fusion algorithm; and obtaining the second YUV image after processing the first fused RGB image with the second processing algorithm.

5. The method according to claim 4, wherein the fusion algorithm comprises:

bilateral filtering an R. image, a G image, and a B image of the first RGB image respectively, with the luminance image as a reference image to obtain the fused RGB image.

6. The method according to claim 1, wherein the image processing pipeline comprises a Bayer conversion algorithm, a first processing algorithm, a demosaicing algorithm, a fusion algorithm, and a second processing algorithm; the obtaining a second YUV image by processing the color image and the panchromatic image with the image processing pipeline comprises:
obtaining a second Bayer image by processing the color image with the Bayer conversion algorithm;
obtaining a second RGB image after processing the second Bayer image with the first processing algorithm and the demosaicing algorithm;
obtaining a luminance image after processing the panchromatic image with the first processing algorithm;
obtaining a second fused RGB image after processing the second RGB image and the luminance image with the fusion algorithm; and
obtaining the second YUV image after processing the second fused RGB image with the second processing algorithm.

7. The method according to claim 2, wherein the first processing algorithm comprises at least one of: Test pattern, image segmentation preprocessing (Crop)/Black Level Correction (BLC), Phase difference pixel correction/Defect pixel correction (PDC/DPC), Lens shading correction (LSC), White balance gain (WBG), Bayer Scaler (BSC), Fusion, and Tone mapping (TMP).

8. The method according to claim 2, wherein the second processing algorithm comprises at least one of: color reduction correction (CMX), gamma correction (GMA), RGB domain to YUV domain.

9. The method according to claim 1, further comprising: processing the first YUV image or the second YUV image with an image post-processing algorithm.

10. The method according to claim 9, wherein the image processing method is implemented through an image pipeline; the image pipeline comprises an image processing engine (IPE) configured to implement the image post-processing algorithm.

11. The method according to claim 9, wherein the image post-processing algorithm comprises at least one of: image correction and adjustment (ICA), advanced noise reduction, temporal filter, Chromatic Aberration Correction (CAC), color space transform, local tone mapping, color correction, gamma correction, 2D Look-Up Table (2D LUT), color adjustment and chroma enhancement (CV&Chroma enhancement), chroma suppression, Adaptive Spatial Filter (ASF), up scaler, grain adder, and down scaler.

12. The method according to claim 1, further comprising: storing the first YUV image and the second YUV image.

13. A camera assembly, comprising an image sensor and a processor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel;
wherein the processor is configured to perform an image processing method comprising:
obtaining a full-size image in a first operation mode of the image sensor; wherein the full-size image comprises a plurality of image pixels; the plurality of image pixels comprise color light-sensitive pixels and panchromatic light-sensitive pixels; for each of the plurality of image pixels, the image pixel is a corresponding pixel of the panchromatic light-sensitive pixels and the color light-sensitive pixels, and a pixel value of the image pixel is generated by the corresponding pixel;
obtaining a first YUV image by processing the full-size image with an image processing pipeline;
obtaining a color image and a panchromatic image in a second operation mode of the image sensor; wherein the color image comprises a plurality of first image pixels, a pixel value of each first image pixel being generated by at least one color-sensitive pixel or at least one panchromatic-sensitive pixel in a corresponding subunit; the panchromatic image comprises a plurality of second image pixels, a pixel value of each second image pixel being generated by at least one panchromatic light-sensitive pixel in a corresponding subunit; and
obtaining a second YUV image by processing the color image and the panchromatic image with the image processing pipeline.

14. The camera assembly according to claim 13, wherein the image processing pipeline comprises a Bayer conversion algorithm, a first processing algorithm, a demosaicing algorithm, and a second processing algorithm; the obtaining a first YUV image by processing the full-size image with an image processing pipeline comprises:
obtaining a full-size Bayer image after processing the full-size image with the Bayer conversion algorithm;
obtaining a full-size RGB image after processing the full-size Bayer image with the first processing algorithm and the demosaicing algorithm; and
obtaining the first YUV image after processing the full-size RGB image with the second processing algorithm.

15. The camera assembly according to claim 13, wherein the color image comprises a first Bayer image, the pixel value of each first image pixel of the first Bayer image being generated by at least one color light-sensitive pixel in a corresponding subunit; the image processing pipeline comprises a first processing algorithm, a demosaicing algorithm, a fusion algorithm, and a second processing algorithm; the obtaining a second YUV image by processing the color image and the panchromatic image with the image processing pipeline comprises:
obtaining a first RGB image by processing the first Bayer image with the first processing algorithm and the demosaicing algorithm;
obtaining a luminance image by processing the panchromatic image with the first processing algorithm;
obtaining a first fused RGB image after processing the first RGB image and the luminance image with the fusion algorithm; and
obtaining the second YUV image after processing the first fused RGB image with the second processing algorithm.

16. The camera assembly according to claim 13, wherein the image processing pipeline comprises a Bayer conversion algorithm, a first processing algorithm, a demosaicing algorithm, a fusion algorithm, and a second processing algorithm; the obtaining a second YUV image by processing the color image and the panchromatic image with the image processing pipeline comprises:
obtaining a second Bayer image by processing the color image with the Bayer conversion algorithm;
obtaining a second RGB image after processing the second Bayer image with the first processing algorithm and the demosaicing algorithm;
obtaining a luminance image after processing the panchromatic image with the first processing algorithm;
obtaining a second fused RGB image after processing the second RGB image and the luminance image with the fusion algorithm; and obtaining the second YUV image after processing the second fused RGB image with the second processing algorithm.

17. The camera assembly according to claim 13, wherein the image processing method further comprises:
    processing the first YUV image or the second YUV image with an image post-processing algorithm.

18. The camera assembly according to claim 17, wherein the image processing method is implemented through an image pipeline; the image pipeline comprises an image processing engine (IPE) configured to implement the image post-processing algorithm; the image post-processing algorithm comprises at least one of: image correction and adjustment (ICA), advanced noise reduction, temporal filter, Chromatic Aberration Correction (CAC), color space transform, local tone mapping, color correction, gamma correction, 2D Look-Up Table (2D LUT), color adjustment and chroma enhancement (CV&Chroma enhancement), chroma suppression, Adaptive Spatial Filter (ASF), up scaler, grain adder, and down scaler.

19. The camera assembly according to claim 13, wherein the image processing method further comprises:
    storing the first YUV image and the second YUV image.

20. A mobile terminal, comprising:
    a camera assembly; and
    a housing, wherein the camera assembly is arranged on the housing;
    wherein the camera assembly comprises an image sensor and a processor; wherein the image sensor comprises a pixel array, the pixel array comprising a plurality of subunits, each subunit comprising at least one panchromatic light-sensitive pixel and at least one color light-sensitive pixel; each color light-sensitive pixel has a narrower spectral response than each panchromatic light-sensitive pixel;
    wherein the processor is configured to perform an image processing method comprising:
    obtaining a full-size image in a first operation mode of the image sensor; wherein the full-size image comprises a plurality of image pixels; the plurality of image pixels comprise color light-sensitive pixels and panchromatic light-sensitive pixels; for each of the plurality of image pixels, the image pixel is a corresponding pixel of the panchromatic light-sensitive pixels and the color light-sensitive pixels, and a pixel value of the image pixel is generated by the corresponding pixel;
    obtaining a first YUV image by processing the full-size image with an image processing pipeline;
    obtaining a color image and a panchromatic image in a second operation mode of the image sensor; wherein the color image comprises a plurality of first image pixels, a pixel value of each first image pixel being generated by at least one color-sensitive pixel or at least one panchromatic-sensitive pixel in a corresponding subunit; the panchromatic image comprises a plurality of second image pixels, a pixel value of each second image pixel being generated by at least one panchromatic light-sensitive pixel in a corresponding subunit; and
    obtaining a second YUV image by processing the color image and the panchromatic image with the image processing pipeline.

* * * * *